(12) United States Patent
Wood et al.

(10) Patent No.: US 10,908,440 B1
(45) Date of Patent: Feb. 2, 2021

(54) METHODS OF EPSILON-NEAR-ZERO OPTICAL MODULATION

(71) Applicant: National Technology & Engineering Solutions of Sandia, LLC, Albuquerque, NM (US)

(72) Inventors: Michael Wood, Albuquerque, NM (US); Salvatore Campione, Albuquerque, NM (US); Gordon Arthur Keeler, Falls Church, VA (US); Kent M. Geib, Elbert, CO (US); Joshua Shank, Albuquerque, NM (US); Jon Ihlefeld, Charlottesville, VA (US); Darwin K. Serkland, Albuquerque, NM (US); Ting S. Luk, Albuquerque, NM (US); Isak C. Reines, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 16/510,012

(22) Filed: Jul. 12, 2019

Related U.S. Application Data

(60) Division of application No. 16/353,930, filed on Mar. 14, 2019, now abandoned, which is a
(Continued)

(51) Int. Cl.
*G02F 1/025* (2006.01)
*G02F 1/01* (2006.01)
(Continued)

(52) U.S. Cl.
CPC ............ *G02F 1/025* (2013.01); *G02F 1/0018* (2013.01); *G02F 1/0102* (2013.01); *G02F 2001/0157* (2013.01)

(58) Field of Classification Search
CPC ...... G02F 1/025; G02F 1/0102; G02F 1/0018; G02F 2001/0157
See application file for complete search history.

(56) References Cited

U.S. PATENT DOCUMENTS

| 4,974,923 A | 12/1990 | Colak et al. |
| 5,757,986 A | 5/1998 | Cramptom et al. |
| (Continued) | | |

FOREIGN PATENT DOCUMENTS

CN 103439807 A 12/2013

OTHER PUBLICATIONS

Reines et al., Compact epsilon-near-zero silicon photonic phase modulators, Optics Express, V. 26, N. 17, 2018 (Year: 2018).*
(Continued)

*Primary Examiner* — Peter Radkowski
(74) *Attorney, Agent, or Firm* — Martin I. Finston; Eugene Rosenthal

(57) ABSTRACT

A method of optical modulation in a non-resonant epsilon-near-zero (EMZ) plasmonic electro-optical modulator is provided. An optical carrier is injected into a waveguide optically coupled to a layer of transparent conductive material having an epsilon-near-zero (ENZ) wavelength. The transparent conductive material layer constitutes a portion of a capacitive structure that includes a gate dielectric layer. A time-varying bias voltage applied across the gate dielectric layer shifts the ENZ wavelength toward the carrier wavelength, and thereby impresses a phase modulation pattern on the carrier wave.

10 Claims, 16 Drawing Sheets

Related U.S. Application Data continuation-in-part of application No. 15/909,767, filed on Mar. 1, 2018, which is a continuation-in-part of application No. 14/880,327, filed on Oct. 12, 2015, now abandoned.

(60) Provisional application No. 62/643,560, filed on Mar. 15, 2018, provisional application No. 62/703,973, filed on Jul. 27, 2018.

(51) Int. Cl.
*G02F 1/00* (2006.01)
*G02F 1/015* (2006.01)

(56) References Cited

U.S. PATENT DOCUMENTS

| | | | |
|---|---|---|---|
| 7,480,425 | B2 | 1/2009 | Gunn et al. |
| 7,880,201 | B2 | 2/2011 | Vlasov et al. |
| 8,014,636 | B2 | 9/2011 | Shubin et al. |
| 8,378,465 | B2 | 2/2013 | Vlasov et al. |
| 8,554,022 | B1 | 10/2013 | Hochberg et al. |
| 8,767,159 | B2 | 7/2014 | Kimura |
| 8,958,678 | B2 | 2/2015 | Thomson et al. |
| 8,983,251 | B2 * | 3/2015 | Lu .......................... G02B 6/10 385/40 |
| 9,002,144 | B2 | 4/2015 | Fujikata et al. |
| 9,042,683 | B2 | 5/2015 | Cho et al. |
| 9,195,052 | B2 * | 11/2015 | Long ...................... G02F 1/0126 |
| 9,244,268 | B2 * | 1/2016 | Long ...................... G02F 1/0126 |
| 9,274,352 | B2 * | 3/2016 | Long ...................... G02F 1/0126 |
| 9,293,627 | B1 | 3/2016 | Beechem, III et al. |
| 9,455,372 | B2 | 9/2016 | Vlasov et al. |
| 9,952,454 | B2 * | 4/2018 | Long ...................... G02F 1/0126 |
| 2004/0208454 | A1 | 10/2004 | Montgomery et al. |
| 2004/0213307 | A1 | 10/2004 | Lieber et al. |
| 2008/0001062 | A1 | 1/2008 | Gunn et al. |
| 2008/0112032 | A1 | 5/2008 | Vlasov et al. |
| 2009/0235721 | A1 | 9/2009 | Robinson et al. |
| 2010/0215309 | A1 | 8/2010 | Shubin et al. |
| 2010/0291828 | A1 | 11/2010 | Reches et al. |
| 2011/0102068 | A1 | 5/2011 | Bouchiat et al. |
| 2011/0104442 | A1 | 5/2011 | Yoon et al. |
| 2011/0111564 | A1 | 5/2011 | Vlasov et al. |
| 2011/0116168 | A1 | 5/2011 | Nikoobakht et al. |
| 2012/0003767 | A1 | 1/2012 | Fujikata et al. |
| 2012/0043527 | A1 | 2/2012 | Ding et al. |
| 2012/0249907 | A1 | 10/2012 | Kimura |
| 2012/0257850 | A1 | 10/2012 | Fujikata et al. |
| 2012/0328237 | A1 | 12/2012 | Ide et al. |
| 2013/0058606 | A1 | 3/2013 | Thomson et al. |
| 2013/0101247 | A1 | 4/2013 | Cho et al. |
| 2013/0143335 | A1 | 6/2013 | Vlasov et al. |
| 2014/0023321 | A1 * | 1/2014 | Lu .......................... B82Y 10/00 385/40 |
| 2014/0056551 | A1 | 2/2014 | Liu et al. |
| 2014/0224989 | A1 * | 8/2014 | Long ...................... G02F 1/009 250/338.4 |
| 2014/0294338 | A1 * | 10/2014 | Long ...................... G02F 1/01 385/8 |
| 2015/0063739 | A1 * | 3/2015 | Long ...................... G02F 1/011 385/1 |
| 2015/0301363 | A1 | 10/2015 | Chen et al. |
| 2016/0103341 | A1 * | 4/2016 | Long ...................... G02F 1/29 359/244 |
| 2018/0203263 | A1 * | 7/2018 | Long ...................... B82Y 20/00 |
| 2018/0203264 | A1 * | 7/2018 | Long ...................... G02F 1/0136 |

OTHER PUBLICATIONS

G. A. Keeler, "Multi-Gigabit Operation of a Compact, Broadband Modulator Based on ENZ Confinement in Indium Oxide," in Optical Fiber Communication Conference, OSA Technical Digest (Year: 2017).*

Hoessbacher et al., The plasmonic memristor: a latching optical Switch, Optica, V. 1, N. 4, 2014 (Year: 2014).*
Babicheva, V.E. and Lavrinenko, A.V. (2012). Plasmonic modulator optimized by patterning of active layer and tuning permittivity. Opt. Commun. 285:5500 (Year: 2012).*
Alam et al., Large optical nonlinearity of indium tin oxide in its epsilon-near-zero region, Science 10.1126/science.aae0330 (Apr. 28, 2016) (Year: 2016).*
Feigenbaum et al., Unity-order index change in transparent conducting oxides at visible frequencies. Nano Lett. 10, 2111-2116 (2010). Medline doi:10.1021/nl1006307 (Year: 2010).*
Kinsey et al., Epsilon-near-zero Al-doped ZnO for ultrafast switching at telecom wavelengths, Optica, V. 2, N. 7, Jul. 2015 (Year: 2015).*
Liu et al., Double-Layer Graphene Optical Modulator, Nano Lett., 2012, 12 (3), pp. 1482-1485 (Year: 2012).*
Lu et al., Nanoscale field effect optical modulators based on depletion of epsilon-near-zero-films, Optics Communications, V. 381, Dec. 15, 2016, pp. 18-23 (Year: 2016).*
Mendelsberg, et al., Determining the nonparabolicity factor of the CdO conduction band using indium doping and the Drude theory, J. Phys. D: Appl. Phys. 45 (2012) 425302 (Year: 2012).*
Park et al. Electrically Tunable Epsilon-Near-Zero (ENZ) Metafilm Absorbers. Sci Rep 5, 15754 (2015) doi:10.1038/srep15754 (Year: 2015).*
Shi et al., Broadband electro-optical modulator based on transparent conducting oxide, Opt. Lett. 39, 4978-4981 (2014) (Year: 2014).*
Vasudev et al., Electro-optical modulation of a silicon waveguide with an "epsilon-near-zero" material, Optics Express, V. 21, N. 22, 2013 (Year: 2013).*
M. J. Connelly, J. Romero-Vivas, A. Meehan and L. Krzczanowicz, "Modeling of Mach-Zehnder and electroabsorption modulator pulse generators and extraction of the chirp factor," 2015 International Conference on Numerical Simulation of Optoelectronic Devices (NUSOD), Taipei, 2015, pp. 67-68. (Year: 2015).*
Shi et al., Ultracompact Field Effect Electro-Absorption Plasmonic Modulator,Oct. 1, 2015, arXiv:1509.08828v2 [physics.optics] https://arxiv.org/vc/arxiv/papers/1509/1509.08828v2.pdf (Year: 2015).*
Lee et al., Nanoscale Conducting Oxide PlasMOStor, NanoLetters, ACS, 2014, 14, 6463-6468. (Year: 2014).*
Lu et al., Ultracompact Electroabsorption Modulators Based on Tunable Epsilon-Near-Zero-Slot Waveguides, IEEE Photonics Journal, V. 4, N. 3, 2012 (Year: 2012).*
Yoon et al., Broadband Epsilon-Near-Zero Perfect Absorption in the Near-Infrared, www.nature.com/scientificreports, 2015 (Year: 2015).*
Sorger et al., Ultra-compact silicon nanophotonic modulator with broadband response, Nanophotonics 1 (2012): 17-22 (Year: 2012).*
Luo et al. Nanoscale Research Letters (2015) 10:199 Graphene-based optical modulators DOI 10.1186/s11671-015-0866-7 (Year: 2015).*
Li et al., Optical absorption in graphene integrated on silicon waveguides, Appl. Phys. Lett. 101, 11110 (2012) (Year: 2012).*
Sachet, E., Shelton, C., Harris, J. et al. Dysprosium-doped cadmium oxide as a gateway material for mid-infrared plasmonics. Nature Mater 14, 414-420 (2015). https://doi.org/10.1038/nmat4203 (Year: 2015).*
Alam, M. Z. et al., "Large optical nonlinearity of indium tin oxide in its epsilon-near-zero region," Science (2016) 10.1126/science.aae0330 (Apr. 28) 6 pages.
Babicheva, V. E. et al., "Plasmonic modulator optimized by patterning of active layer and tuning permittivity," Optics Communications (2012) 285:5500-5507.
Connelly, M. J. et al., "Modeling of Mach-Zehnder and electroabsorption modulator pulse generators and extration of the chirp factor," 2015 International Conference on Numerical Simulation of Optoelectronic Devices (NUSOD), Taipei, pp. 67-68.
Ipdia, "Integrated Passive Devices Technology Breakthrough by IPDIA," White Paper (2010) 6 pages.
Kinsey, N. et al., "Epsilon-near-zero Al-doped ZnO for ultrafast switching at telecom wavelengths," Optica (2015) 2(7):616-622.
Lu, Z. et al., "Nanoscale field effect optical modulators based on depletion of epsilon-near-zero-films," Optics Communications (2016) 381:18-23.

(56) References Cited

OTHER PUBLICATIONS

Mendelsberg, R. J. et al., "Determining the nonparabolicity factor of the CdO conduction band using indium doping and the Drude theory," J. Phys. D.: Appl. Phys. (2012) 45:425302, 12 pages.
Park, J. et al., "Electrically Tunable Epsilon-Near-Zero- (ENZ) Metafilm Absorbers," Scientific Reports (2015) 5:15754, 9 pages.
Schrenk, B. et al., "Flexible Optical QAM Generation with a Low-Complexity Amplified InP SOA/EAM-Based Modulator," ECOC Technical Digest (2012) Tuy.4.A.6.pdf, 3 pages.
Shi, K. et al., "Broadband electro-otpical modulator based on transparent conducting oxide," Optics Letters (2014) 39(17):4978-4981.
Timurdogan, E. et al., "An ultralow power athermal silicon modulator," Nature Communications (2014) 5:4008, 11 pages.
Vasudev, A. P. et al., "Electro-optical modulation of a silicon waveguide with an "epsilon-near-zero" material," Optics Express (2013) 21(22):26387-26397.
Xu, G. et al., "Low-Voltage Electro-Optic Modulator Structure using Transparent Conducting Oxide with High conductivity-Loss Ratio as Electrodes," IEEE Conference Avionics Fiber-Optics and Photonics (2005) Minneapolis, MN, pp. 77-78.
Babicheva, et al., "Towards CMOS-compatible nanophotonics: Ultra-compact modulators using alternative plasmonic materials," Optics Express, Nov. 4, 2013, vol. 21, No. 22, pp. 27326-27337.
Boltasseva, A. et al., "Low-loss plasmonic metamaterials," Science, vol. 331, pp. 290-291, 2011.
Campione, S. et al., "Electric field enhancement in ϵ-near-zero slabs under TM-polarized oblique incidence," Phys. Rev. B, 2013, vol. 87, Art. No. 035120.
Campione, S. et al., "Submicrometer Epsilon-Near-Zero Electroabsorption Modulators Enabled by High-Mobility Cadmium Oxide," IEEE Photonics Journal, 2017, vol. 9, 6601307.
Feigenbaum et al., "Unity-Order Index Change in Transparent Conducting Oxides at Visible Frequencies," NanoLetters 2010, vol. 10, pp. 2111-2116.
Hoessbacher et al., "The plasmonic memristor: a latching optical switch," OPTICA, vol. 1, No. 4, pp. 198-202, Oct. 2014.
Huang et al., "A Sub-λ-Size Modulator Beyond the Efficiency-Loss Limit," IEEE Photonics Journal, vol. 5, No. 4, Aug. 2013, 12 pages.
Keeler, G. A. et al., "Multi-gigabit operation of a compact, broadband modulator based on ENZ confinement in indium oxide," in Proc. Opt. Fiber Commun. Conf., Los Angeles, CA, USA, 2017, Paper Th3I.1.
Kik et al., "Design and performance of an erbium-doped silicon waveguide detector operating at 1.5 um," in Journal of Lightwave Technology, vol. 20, No. 5, pp. 862-867, May 2002.
Koch, U. et al. "Digital plasmonic absorption modulator exploiting epsilon-near-zero in transparent conducting oxides," IEEE Photon. J., vol. 8, No. 1, Feb. 2016, Art. No. 4800813.
Lee et al., "Nanoscale Conducting Oxide PlasMOStor," NANOLetters, vol. 14, 2014, pp, 6463-6468.
Liu et al., "A graphene-based broadband optical modulator," Nature vol. 474, pp. 64-67, Jun. 2, 2011.
Liu et al., "Double-Layer Graphene Optical Modulator," Nano Lett., 2012, 12 (3), pp. 1482-1485.
Liu et al., "A high-speed silicon optical modulator based on a metal-oxide-semiconductor capacitor," Nature, Feb. 12, 2004;427(6975):615-8.
Lu et al., "Ultracompact Electroabsorption Modulators Based on Tunable Epsilon-Near-Zero-Slot Waveguides," IEEE Photonics Journal, pp. 735-740, vol. 4, No. 3, Jun. 2012.
Melikyan et al., "Surface plasmon polariton absorption modulator," Optics Express, 2011, vol. 19, pp. 8855-8869.

Piper, L.F. et al. "Observation of quantized subband states and evidence for surface electron accumulation in CdO from angle-resolved photoemission spectroscopy," Physical Review B, 2008, vol. 78, 165127.
Phare et al., "Graphene electro-optic modulator with 30 GHz bandwidth," Nature Photonics, 2015, vol. 9, p. 511 (submitted on Nov. 7, 2014 to http://arxiv.org/abs/1411.2053).
Sachet, E. et al., "Dysprosium-doped cadmium oxide as a gateway material for mid-infrared plasmonics," Nature Mater., 2015,vol. 14, pp. 414-420.
Shi, K et al., "Field-effect optical modulation based on epsilon-near-zero conductive oxide," Opt. Commun., 2016, vol. 370, pp. 22-28.
Sorger, V. et al., "Ultra-compact silicon nanophotonic modulator with broadband response," Nanophotonics vol. 1: pp. 17-22, Sep. 2012.
Das, S. et al., "Tunable Nano-photonic Devices," Dissertation, University of Kansas, 2016, available at https://www.ittc.ku.edu/research/thesis/documents/Susobhan_Das_thesis.pdf.
Zhu, S. et al., "Design of an ultra-compact electro-absorption modulator comprised of a deposited TiN/Hf02/ITO/Cu stack for CMOS backend integration," Optics Express, 2014, vol. 22, p. 17930.
Wood, M. G. et al., "Gigahertz speed operation of epsilon-near-zero silicon photonic modulators," Optica 5, 4 (2018).
Ebrish et al. Border Trap Characterization in Metal-Oxide-Graphene Capacitors with HfO2 Dielectrics; available at http://people.ece.umn.edu/users/skoester/2013_DRC_Ebrish.pdf(Year: 2013).
Ding et al., Coupling of plasmon and photon modes in a graphene-based multilayer structure, Opt. Lett. 40, 4524-4527 (2015) (Year: 2015).
Alú, A. et al., "Epsilon-near-zero metamaterials and electromagnetic sources: Tailoring the radiation phase pattern," Phys. Rev. B 75, 155410 (2007).
Argyropoulos, C. et al., "Boosting optical nonlinearities in ϵ-near-zero plasmonic channels," Phys. Rev. B 85, 045129 (2012).
Campione, S. et al., "Theory of epsilon-near-zero modes in ultrathin films," Phys. Rev. B 91, 121408 (2015).
Maas, R. et al., "Experimental realization of an epsilon-near-zero metamaterial at visible wavelengths," Nat. Photonics 7, 907 (2013).
Vassant, S. et al., "Berreman mode and epsilon near zero mode," Opt. Express 20, 23971 (2012).
Campione, S. et al., "Ultrafast Epsilon-Near-Zero Electroabsorption Modulators," Sandia National Laboratories, 2018, SAND2018-6837C.
Campione, S. et al., "Ultrafast Epsilon-Near-Zero Electroabsorption Modulators," Sandia National Laboratories, 2018, SAND2018-0303C.
Campione, S. et al., "High-Mobility Transparent Conducting Oxides for Compact Epsilon-Near-Zero Silicon Integrated Optical Modulators," Sandia National Laboratories, 2017, SAND2017-5730C.
Campione, S. et al., "High-Mobility Transparent Conducting Oxides for Compact Epsilon-Near-Zero Silicon Integrated Optical Modulators," Sandia National Laboratories, 2017, SAND2017-10045C.
Campione, S. et al., "Compact Silicon Photonic Phase Modulators based on Epsilon-Near-Zero Materials," Sandia National Laboratories, 2018, SAND2018-10976C.
Freeman, A.J. et al., "Chemical and Thin-Film Strategies for New Transparent Conducting Oxides," MRS Bulletin, 2000, pp. 45-51.
Keeler, G.A. et al., "High-Speed Operation of a Compact ENZ Electroabsorption Modulator Based on Transparent Conducting Oxides," Sandia National Laboratories, 2016, SAND2016-12960C.
Reines, I.C. et al., "Compact epsilon-near-zero silicon photonic phase modulators," Optics Express, 2018, vol. 26, pp. 21594-21605.

* cited by examiner

METHODS OF EPSILON-NEAR-ZERO OPTICAL MODULATION

CROSS-REFERENCE TO RELATED APPLICATIONS

This is a divisional of U.S. patent application Ser. No. 16/353,930, which was filed on Mar. 14, 2019 by Michael Wood et al. under the title, "METHODS OF EPSILON-NEAR-ZERO OPTICAL MODULATION", which is a continuation-in-part of U.S. patent application Ser. No. 15/909,767, which was filed on Mar. 1, 2018 by Michael Wood et al. under the title, "Electroabsorption Optical Modulator". The abovesaid application Ser. Nos. 16/353,930 and 15/909,767 are commonly owned herewith. The abovesaid application Ser. Nos. 16/353,930 and 15/909,767 are hereby incorporated herein by reference in entirety.

The abovesaid application Ser. No. 15/909,767 is a continuation-in-part of prior application Ser. No. 14/880,327, which was filed on Oct. 12, 2015 by Gordon Arthur Keeler et al. under the title, "Electroabsorption Optical Modulator", and which is now abandoned.

This application claims the benefit of priority to U.S. Provisional Patent Application No. 62/643,560, filed Mar. 15, 2018 under the title, "Electroabsorption Optical Modulator", commonly owned herewith, the entire contents of which are hereby incorporated herein by reference.

This application claims the benefit of priority to U.S. Provisional Patent Application No. 62/703,973, filed Jul. 27, 2018 under the title, "Compact Epsilon-Near-Zero Phase Modulator", commonly owned herewith, the entire contents of which are hereby incorporated herein by reference.

GOVERNMENT RIGHTS IN THE INVENTION

This invention was made with United States Government support under Contract No. DE-NA0003525 between National Technology & Engineering Solutions of Sandia, LLC and the United States Department of Energy/National Nuclear Security Administration. The United States Government has certain rights in this invention.

TECHNICAL FIELD

This invention relates to optical modulators, and more particularly, to modulation methods using electro-optical optical modulators.

BACKGROUND OF THE INVENTION

An optical modulator is a device that can be used for manipulating a property of light, typically in the form of a beam of electromagnetic radiation such as a laser beam. Depending on which property of light is controlled, modulators may be intensity modulators, phase modulators, polarization modulators, spatial light modulators, and so forth. A wide range of optical modulators are used in very different application areas, such as in optical fiber communications, displays, mode locking of lasers, and the like.

It is known that an optical modulator can be made that operates based on electroabsorption of a surface plasmon polariton, also known simply as "plasmon" or "plasmonic" mode, by an induced layer of free carriers in a transparent conducting oxide such as a transparent conducting oxide (TCO) layer and, in particular, a layer of indium-tin-oxide (ITO). Such a plasmonic electroabsorption modulator can be fabricated using standard semiconductor processing techniques, and if may be integrated with standard photonic integrated circuits, including silicon photonics and compound semiconductor-based platforms.

The objectives of wide optical bandwidth and device miniaturization have been achieved jointly in hybrid silicon modulators that exhibit plasmonic and epsilon-near-zero (ENZ) effects. ENZ effects occur in some materials near an optical frequency for which the real part of a material's permittivity crosses zero, whereby the material transitions from a low-loss dielectric to a lossy metal. At frequencies near this transition point, light-matter interaction can be greatly enhanced by confining light into sub-wavelength geometries. This effect is discussed, for example, in S. Campione et al., IEEE Photonics J. 9, 6601307 (2017), which is cited hereinbelow as Campione 2017, and also in: S. Vassant et al., Opt. Express 20, 23971 (2012); S. Campione et al., Phys. Rev. B 91, 121408 (2015); S. Campione et al., Phys. Rev. B 87, 035120 (2013); C. Argyropoulos et al., Phys. Rev. B 85, 045129 (2012); A. Alù et al., Phys. Rev. B 75, 155410 (2007); and R. Maas et al., Nat. Photonics 7, 907 (2013). The entirety of each of the foregoing publications is hereby incorporated herein by reference.

Although silicon-based plasmonic electroabsorption modulators have shown promise, there remains a need for improvements in performance characteristics such as speed, modulation depth, and modulation depth per unit propagation length.

It is also notable that until now, most modeling and experimental efforts directed to hybrid silicon modulators have focused on amplitude modulation rather than phase modulation. Thus, there remains a need for an optical phase modulator that can be miniaturized to the micrometer scale while meeting various other practical requirements.

SUMMARY OF THE INVENTION

The enhanced carrier concentration that can be induced by applied voltages in a plasmonic modulator can be used for both amplitude modulation and for phase modulation. For example, electroabsorption effects can be used for amplitude modulation. In other examples, field-effect carrier-density tuning can be used for phase modulation. Here, we will refer generally to a "plasmonic electro-optical modulator" that in some specific embodiments can be used for amplitude modulation, and other specific embodiments can be used for phase modulation.

We have found several favorable structural designs and material selections for electro-optical modulators. Specifically, we have brought about substantial performance improvements in compact silicon photonic modulators at 1.55 μm that use ENZ confinement in transparent conducting oxide (TCO) films. The improvements can facilitate methods of phase modulation as well as methods of high-speed amplitude modulation in compact, silicon-based, ENZ devices.

In one aspect, the invention relates to a phase modulation method using a silicon waveguide having a layer of transparent conductive material such as a transparent conductive oxide (TCO) deposited on at least one of its sides, wherein the transparent conductive layer is optically coupled to a non-resonant, capacitive phase modulator section of the waveguide. The transparent conductive material must have an ENZ wavelength that is longer than the wavelength of the optical carrier signal when the transparent conductive material is unbiased.

The method involves injecting the optical carrier into the silicon waveguide and applying a bias voltage across the transparent conductive material layer and a gate dielectric layer deposited on the transparent conductive material layer so as to shift the ENZ wavelength of the transparent conductive material to a shorter wavelength, thereby modulating the phase of the optical carrier signal in the phase modulator section of the waveguide.

In embodiments, the bias voltage is applied between a base electrical contact to the transparent conductive oxide layer and a top gate electrical contact deposited on the gate dielectric layer.

In embodiments, the transparent conductive oxide has a mobility greater than 50 $cm^2/Vs$ in the biased state, or more particularly, a mobility greater than 100 $cm^2/Vs$ in the biased state, or still more particularly, a mobility greater than 200 $cm^2/Vs$ in the biased state.

In embodiments, the transparent conductive oxide comprises cadmium oxide.

BRIEF DESCRIPTION OF THE DRAWINGS

FIG. 1A is a perspective view and FIG. 1B is a cross sectional view of the plasmonic electro-optical modulator.

FIG. 8A describes the optical absorption per unit length in unbiased transparent conductor layers of indium oxide and cadmium oxide, respectively. FIG. 8B describes the optical absorption per unit length in the same layers under bias.

DETAILED DESCRIPTION

Modulator structures. We have developed favorable new designs for plasmonic electro-optical modulators, involving various structural changes and material selections. For example, in various implementations, at least a portion of the waveguide may be made conductive, exemplarily by doping. In other implementations, layers that make up the modulator structure may be placed on lateral sides of waveguides in addition to or instead of simply placing them on the top of the waveguide.

In further implementations, a so-called "high permittivity" or "high-k" gate dielectric material may be employed. Also, materials other than indium tin oxide (ITO) may be employed as transparent conductor. Such an improved plasmonic electro-optical modulator can be fabricated using standard semiconductor processing techniques and may be integrated with standard photonic integrated circuits, including silicon photonics and compound semiconductor-based platforms. Advantageously, high-speed, low-voltage operation over a wide spectrum of wavelengths may be achieved.

In implementations, the plasmonic electro-optical modulator structure has specific layers arranged on one or more sides of a semiconductor optical waveguide, e.g., a single-mode semiconductor optical waveguide. By "side" in this regard is meant any of one or more lateral sides and/or the top of the waveguide, but not the bottom of the waveguide, which is attached to the substrate layer. Such an arrangement may be achieved by sequentially coating the most exterior layer that is adjacent to the side of the waveguide with the next layer of the structure so as to build up the structure.

The waveguide may be a semiconductor optical waveguide and may be a single mode waveguide. Exemplary such waveguides include strip waveguides, ridge waveguides, or buried channel waveguides.

Figure 1A:
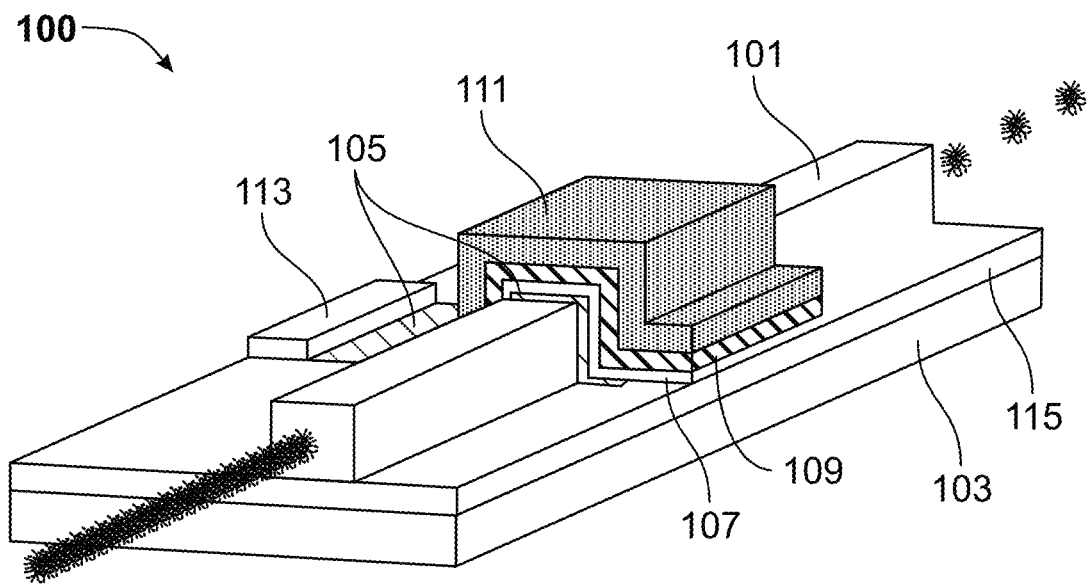
FIGS. 1A and 1B show an exemplary plasmonic electro-optical modulator arranged in accordance with principles described here.
Figure 1B:
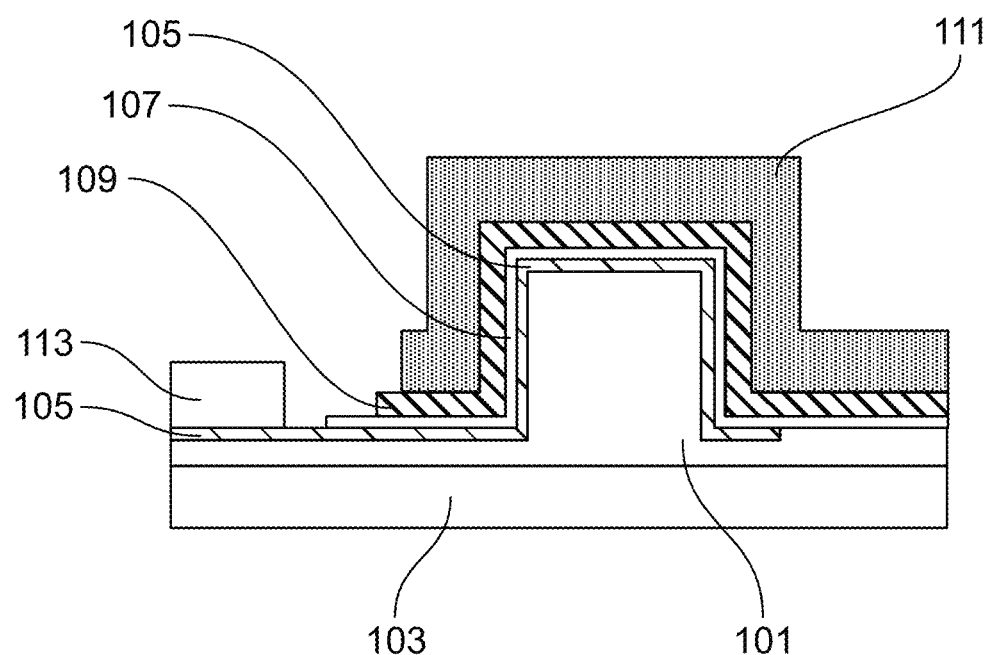

FIGS. 1A and 1B show exemplary plasmonic electro-optical modulator 100 arranged in accordance with principles described here. More specifically, FIG. 1A is a perspective view of plasmonic electro-optical modulator 100 and FIG. 1B is a cross section of plasmonic electro-optical modulator 100. In the exemplary implementation shown in the figures, the semiconductor optical waveguide is silicon ridge waveguide 101 formed on buried oxide layer 103. Waveguide 101 is formed by etching silicon of a silicon-on-insulator (SOI) wafer. The dimensions of waveguide 101 may be in a range of between about 150 nm and about 1000 nm in both transverse dimensions. Thus, silicon layer 115 on buried oxide layer 103 has protruding therefrom silicon waveguide 101 in the manner shown in the figures.

Although the entire structure 100 is informally referred to here as a plasmonic electro-optical modulator, waveguide 101 has a particular section where the various functional layers are placed. That section of the waveguide, together with the functional layers, may also be referred to herein as the plasmonic modulator, the electro-optical modulator, the modulator section, or simply as the modulator. Those of ordinary skill in the art will readily understand from the context what is meant in any particular instance.

Significantly, the structure is non-resonant; that is, it does not rely on a standing wave within an optical cavity to concentrate the modulated electromagnetic field, but instead modulates a traveling optical wave as it propagates through a waveguide.

In the conventional manner, a dielectric cladding of, e.g., SiO2 (omitted from the figure to reveal underlying structure) may surround the semiconductor waveguide on one or more of its sides. Such a dielectric cladding may be put on at one of several points in the process of forming the modulator structure, e.g., before the rest of the modulator structure is formed and then removed in the area of the modulator, or it may be applied after the modulator is completed.

In various implementations, at least a layer of semiconductor waveguide 101 that is part of the modulator may be made more conductive, exemplarily by doping. The doping is performed at least along any one or more sides of the waveguide that is covered with gate dielectric and transparent conductor, as described hereinbelow. The entire waveguide section may be doped, i.e., the entire section of the waveguide within the modulator may be doped throughout its cross section.

The doping may, e.g., be performed by implantation. In embodiments, the doping creates a p-type layer. In other embodiments, an n-type layer is formed.

FIGS. 1A and 1B show doped region 105 of waveguide 101 as lying within the cross section of waveguide 101 (although close inspection of the figure may be necessary due to the complexity of the figure). In various implementations, the doping which is used to form doped region 105 within the cross section of waveguide 101 may be extended outward from waveguide 101 into silicon layer 115.

Doped semiconductor layer 105 is seen in the figure as extending within silicon layer 115 from waveguide 101. A first electrical contact, i.e., a so-called "bottom" contact 113, having a low electrical resistance to doped semiconductor layer 105 may be formed on layer 105 near waveguide 101. For example, bottom contact 113 may be formed as close as possible to the rest of the modulator structure without forming a short circuit between the bottom contact 113 and the rest of the modulator structure, e.g., the transparent conductor and/or second contact as described below.

Bottom contact 113 may be formed using silicide, metal, high doping implants, and the like. It forms a low resistance path between metal wiring (not shown) that will be affixed thereto in the conventional manner to carry control signals and doped semiconductor region 105 that is within optical waveguide 101 and makes up the top and/or one or more of its lateral sides. In other words, doped portion 105 of waveguide 101 may be extended beyond waveguide 101 in the exemplary manner shown in FIG. 1A and FIG. 1B. Doing so allows bottom contact 113 to be formed laterally to waveguide 101 and in close proximity thereto.

Thin dielectric layer 107, also referred to as "gate dielectric layer" 107, is formed on one or more sides of the waveguide. In some implementations, the gate dielectric material has a high permittivity, i.e., permittivity in a range of about 4-10 or greater. Also, in some implementations, the gate dielectric material is substantially transparent over the operating wavelengths of the modulator. Exemplary materials suitable for use as the dielectric material include hafnium dioxide (HfO$_2$), aluminum oxide (Al$_2$O$_3$), hafnium silicon oxynitride (HfSiON), combinations and derivations of the foregoing materials, and the like.

In one example implementation, gate dielectric layer 107 is made of HfO$_2$ that has a thickness in the range of about 3 nm to about 10 nm and which was deposited by atomic layer deposition. The high permittivity dielectric material of dielectric layer 107 is arranged to be in contact with the immediately adjacent doped semiconductor layer 105 on one or more sides of waveguide 101.

Transparent conductor layer 109 is arranged to be in contact with gate dielectric layer 107, exemplarily as a coating located on one or more immediately adjacent sides of waveguide 101. Transparent conductor layer 109 need not coat all of gate dielectric layer 107. In some embodiments, transparent conductor layer 109 is formed on the top and lateral sides of waveguide 101, but not on the bottom. (As seen in the figures, the bottom is the portion of waveguide 101 nearest silicon layer 115 and buried oxide layer 103.)

The material employed for transparent conductor layer 109 desirably exhibits low optical loss over the operating wavelengths of the modulator, e.g., without an applied electric field, but for purposes of amplitude modulation, it desirably becomes highly lossy when its carrier density is increased during operation by the application of an electrical control signal.

Exemplary materials from which layer of transparent conductor 109 may be formed include transparent conducting oxides such as indium oxide (In$_2$O$_3$), tin oxide (SnO$_2$), and indium tin oxide (ITO); zinc oxide (ZnO$_2$) and doped zinc oxides such as aluminum doped zinc oxide, also known as AZO, gallium doped zinc oxide, also known as GZO, indium doped zinc oxide, also known as IZO; cadmium oxide; graphene; combinations and derivations of these materials; and the like.

In various implementations, the material for transparent conductor layer 109 is selected for a carrier concentration that is moderately high, e.g., on the order of $1\times10^{19}$ cm$^{-3}$, but still low enough for its plasma wavelength to be longer than the operating wavelength of modulator 101. Wavelengths particularly suitable for modulation by modulator 101 include those in the range from about the visible through about the midwave infrared, and preferably in the near or shortwave infrared, e.g., in a range between about 750 nm through about 3 µm. In one exemplary embodiment of the invention designed for operation using a wavelength of about 1550 nm (1.55 µm), transparent conductor layer 109 is formed using 5 nm to 20 nm of indium oxide, which is deposited by sputtering under conditions that achieve a nominal carrier density of about $1 \times 10^{19}$ $cm^{-3}$.

Gate dielectric layer 107 acts as an insulating layer. It is placed so that it substantially prevents the flow of DC electrical current between doped semiconductor layer 105 and transparent conductor layer 109.

Second contact 111, also referred to as top contact 111, is formed as a low-resistance contact to transparent conductor layer 109. Contact 111 is formed on one or more sides of waveguide 101 so as to coating transparent conductor layer 109. Contact 111 is formed of a metal with low optical losses at the operating wavelength. Exemplary materials from which the top contact may be formed include gold, silver, copper, and aluminum. Other examples are any of various doped semiconductors. Another example is titanium nitride. Still other examples are combinations and derivatives of any of the foregoing materials. The foregoing list is exemplary and not limiting.

Top contact 111 is used for applying a signal which controls modulation of the electric field across gate dielectric layer 107 with very little DC current flow. Concurrently, top contact 111 forms part of the plasmonic waveguide. As such, top contact 111 helps, along with layers 105, 107, and 109, to provide a strong optical confinement in the transparent conductor layer by supporting a plasmonic or photonic/plasmonic hybrid waveguide mode in the section of waveguide 101 where modulation takes place, i.e., in the region of waveguide 101 adjacent to layers 105, 107, and 109.

A metal connection, e.g., a wire or a conductive via (not shown in the figure) may be connected in a conventional manner to any part of top metallic contact 111. In implementations, top metallic contact 111 may extend from waveguide 101 and further onto the layers extending onto silicon layer 115, e.g., as shown in FIGS. 1A and 1B. This may, e.g., facilitate the connection to the metal wire or a conductive via from a different layer to enable application of an electric bias, for example from an external circuit.

In an example, top metallic contact 111 is made of a deposited layer of gold with a thickness having a range of between about 50 nm and about 1000 nm and with a length parallel to the waveguide in a range of about 1-20 µm.

Doped semiconductor layer 105, gate dielectric layer 107, and transparent conductor layer 109 together form a capacitor. The doped semiconductor layer 105 constitutes the bottom plate of the capacitor and the transparent conductor layer 109 (together with the top metallic contact 111) constitutes the top plate of the capacitor. Significantly, the bottom plate in such an arrangement does not include a layer of metal, and the gate dielectric layer can be applied directly onto the doped semiconductor layer. In such an arrangement, the bottom metal contact 113 may be deposited at a position that is offset from the active region of the modulator.

The gate dielectric layer 107 and the transparent conductor layer 109 may be viewed together as constituting a bilayer. In other embodiments of the invention, as will be seen below, this bilayer can be inverted relative to the structure described above.

Top contact 111 and bottom contact 113 enable application of an electrical field across this capacitor. By changing the electrical bias, the amount of change which is required depending on the thickness of the various layers, e.g., in a range between about −5 V to about +5 V, the density of electrical carriers, e.g., electrons, in transparent conductor layer 109 can be controlled, and an accumulation of carriers can be formed in transparent conductor layer 109 near its interface with gate dielectric layer 107.

If the density of electrical carriers is sufficiently high, e.g., greater than $1 \times 10^{20}$ $cm^{-3}$, such an accumulation of carriers may significantly increase the optical loss of the modulator, thus providing the possibility of amplitude modulation by electroabsorption. Depending on the arrangement of the layers described (for example, whether they are placed on the top or on the lateral sides of the waveguide), transverse magnetic (TM) and/or transverse electric (TE) polarized light may be modulated.

In the manner shown in FIG. 1A, continuous wave (CW) light is input to modulator 101 and modulated output light exits at the other end, where the modulation depends on the voltage applied between bottom contact 113 and gate contact 111.

Figure 2A:
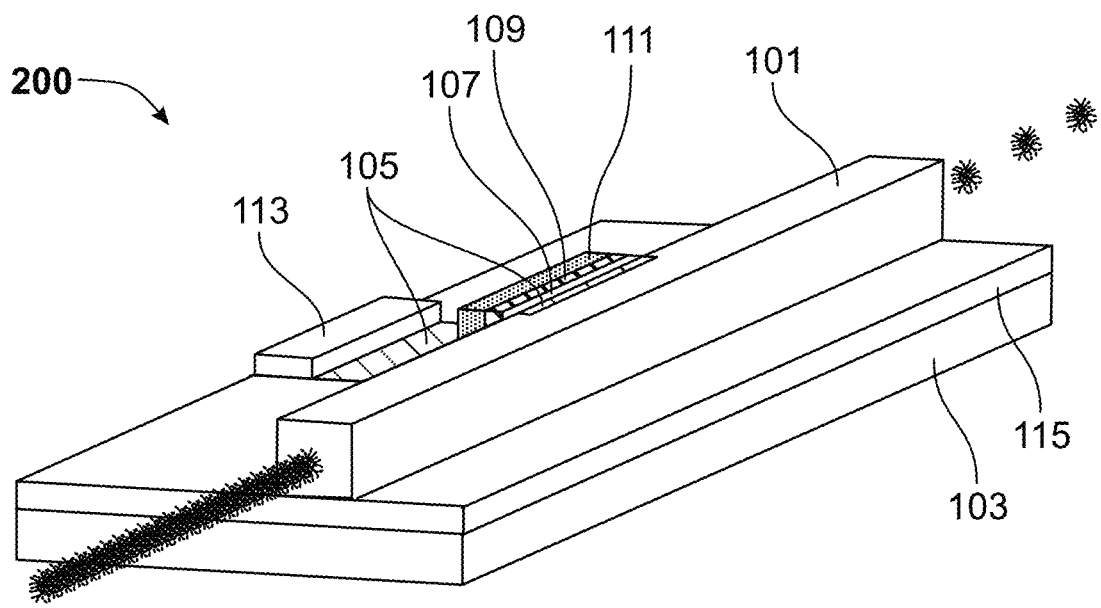
FIGS. 2A and 2B show a modulator arranged in accordance with principles described here. The modulator of FIGS. 2A and 2B is similar to the modulator of FIGS. 1A and 1B, except that the various constituent layers are now formed only on one side of the waveguide.
Figure 2B:
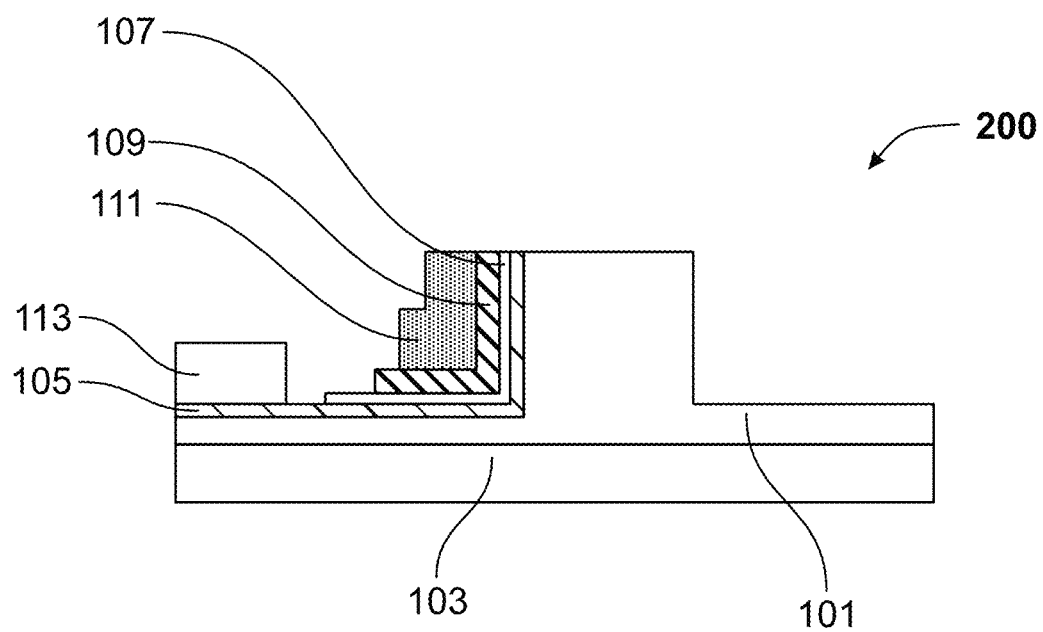

FIGS. 2A and 2B show modulator 200 arranged in accordance with principles described here and which is similar to modulator 100 of FIGS. 1A and 1B. However, the various layers of the structure that make up modulator 200 are on only one side of waveguide 101.

Figure 3A:
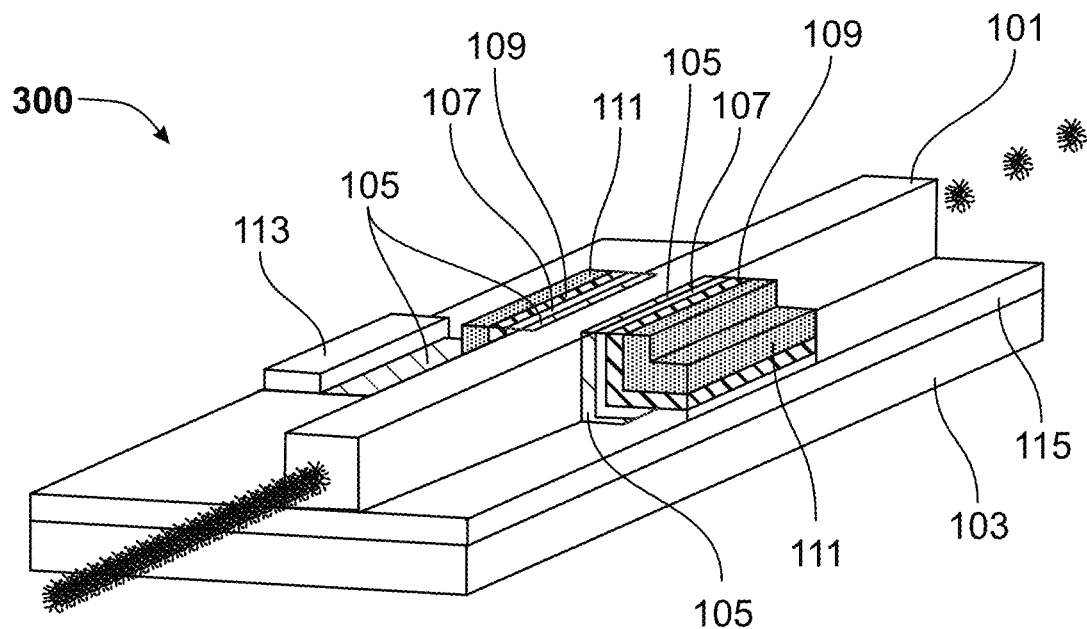
FIGS. 3A and 3B show a modulator arranged in accordance with principles described here. The modulator of FIGS. 3A and 3B is similar to the modulator of FIGS. 1A and 1B, except that the various constituent layers are now formed only on the lateral sides of the waveguide.
Figure 3B:
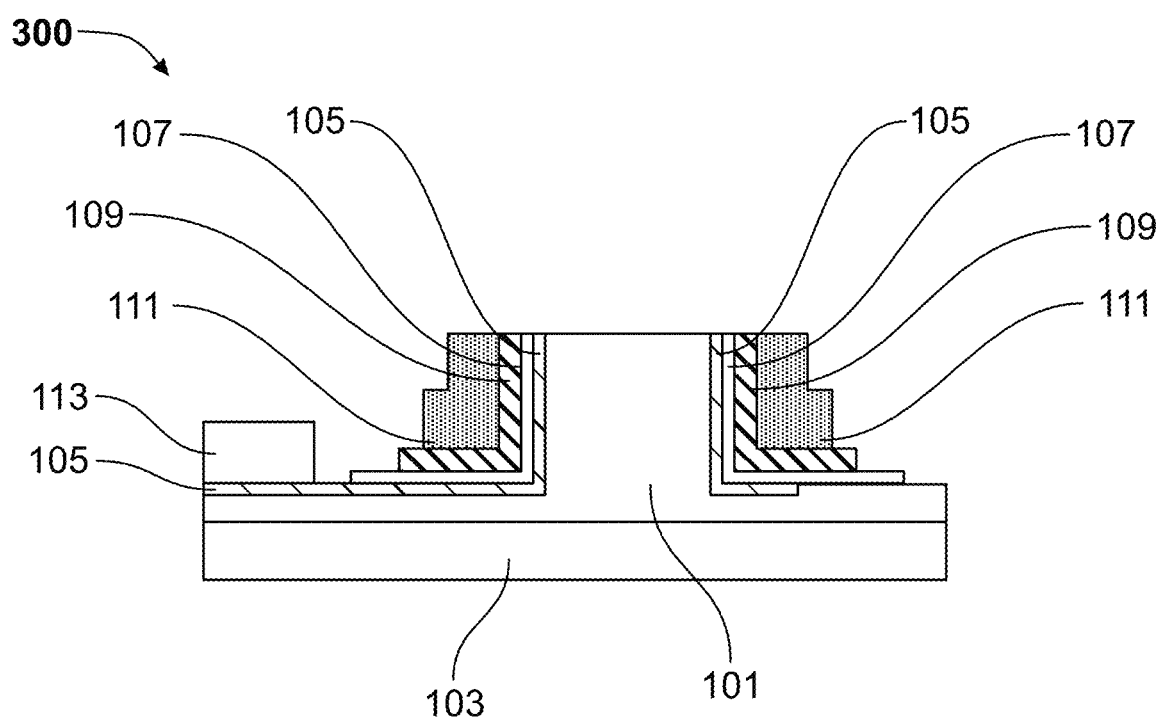

FIGS. 3A and 3B show modulator 300 arranged in accordance with the principles of the invention. Modulator 300 is similar to modulator 100 of FIGS. 1A and 1B. However, the various layers of the structure that make up modulator 300 are on the lateral sides only of waveguide 101, and not on the top thereof. To achieve such an embodiment, doped layer 105 may need to extend within waveguide 101 so that both sides of waveguide are electrically connected.

Alternatively, an additional bottom contact (not shown) may be formed on the side of waveguide 101 opposite from bottom contact 113. This additional contact could be formed, e.g., on an extension of doped layer 105 similar to extension of doped silicon 105 shown in FIG. 3. Both bottom contacts could be coupled by a wire. In such an embodiment, both gate contacts 111 would to be coupled together by a wire or a via (neither of which is shown in the figure).

In the embodiments of FIGS. 1A-3B, the modulator advantageously operates in one or more hybrid plasmonic-photonic modes of TE polarization, which is the most commonly used polarization mode with integrated silicon photonics. Advantageously, the embodiment of FIGS. 1A and 1B may be operated in one or more hybrid plasmonic-photonic modes of TE and TM polarization making the optical modulator more broadly usable.

Typically, the speed of the modulator, i.e., the rate at which, e.g., an amplitude modulator can be switched from largely absorbing propagating light to largely transmitting propagating light, is limited primarily by resistance-capacitance (RC) charging times. In this regard, the capacitance is primarily the capacitance designed into the modulator. The resistance includes contributions from all of the electrical traces leading up to the capacitor, and it may also include carrier transit effects.

In order to achieve high-speed modulation, e.g., at rates beyond the 1 GHz range, both the resistance and capacitance of the modulator should be minimized. These properties can be minimized using conventional techniques for optical device design and semiconductor device design.

As noted above, the gate dielectric layer and the transparent conductor layer may be viewed together as constituting a bilayer, which can be inverted in alternate embodiments of the invention.

Figure 4:
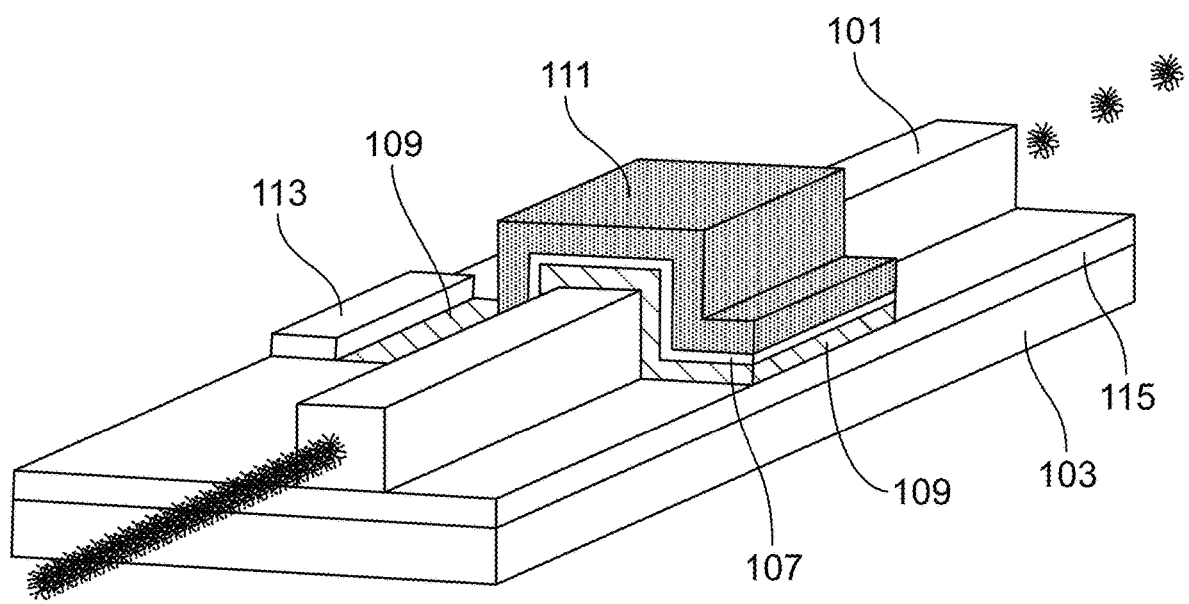
FIG. 4 shows another example modulator in which a layer of the modulator of FIGS. 1A and 1B is eliminated and two other layers of the modulator of FIGS. 1A and 1B have their positions transposed.

Accordingly, FIG. 4 shows a "flipped" embodiment 400 of the invention in which doped semiconductor layer 105 has been omitted and gate dielectric layer 107 and transparent conductor layer 109 have their positions transposed. The various layers extend along lateral sides of waveguide 101.

In such an embodiment, gate dielectric layer 107 now separates top contact 111 from transparent conductor layer 109. Transparent conductor layer 109 is coupled to bottom contact 113. The capacitor is formed between transparent conductor layer 109, gate dielectric layer 107 and top contact 111.

Importantly, the bottom plate of the capacitor in such an arrangement does not include a layer of metal. Instead, the transparent conductor can be applied directly onto the semiconductor waveguide. In such an arrangement, the bottom contact may be constituted by a metal layer deposited on transparent conductor layer 109 at a position that is offset from the active region of the modulator.

As noted above, it is desirable for the transparent conductor layer to exhibit low optical loss over the operating wavelengths of the modulator in the absence of an applied electric field, but (for purposes of electroabsorption amplitude modulation) to exhibit high loss when an applied field causes the carrier density to increase.

Indium oxide, for example, is advantageous because it exhibits these properties at wavelengths in the near-infrared part of the spectrum. Indeed, suitable bias with an applied electric field can produce high loss near 1550 nm, which is a near-infrared wavelength of particular interest.

Further, a transparent conductor layer of indium oxide can be made with a nominal carrier density of about $1 \times 10^{19}$ cm$^{-3}$, which provides good conductivity while still offering a plasma wavelength longer than 1550 nm or other desired operating wavelengths of the modulator.

Epsilon-near-zero (ENZ) materials. The material of transparent conductor layer 109 is advantageously chosen to be an epsilon-near-zero (ENZ) material. The material should have an ENZ point that, absent electrical bias, would fall at wavelengths longer than a target carrier wavelength such as 1.55 µm. (The ENZ point is the wavelength where the real part of the permittivity crosses between negative and positive values as the wavelength is varied.) This would assure that absent bias, the TCO material would behave like a dielectric at the target wavelength.

The ENZ point depends on the carrier concentration. Thus, a desirable transparent conductor is selected, in part, for an unbiased static carrier concentration that places the ENZ point at a wavelength longer than 1.55 µm (or another desired operating wavelength).

When a bias voltage is placed across the device, an accumulation layer is formed at the top of the transparent conductor layer near the gate dielectric. Increasing the bias voltage tends to increase the carrier concentration in the accumulation layer, which causes significant changes in the dielectric permittivity, ENZ wavelength, and field profile within the modulator. This is discussed, for example, in G. A. Keeler et al., "Multi-Gigabit Operation of a Compact, Broadband Modulator Based on ENZ Confinement in Indium Oxide," in *Optical Fiber Communication Conference* (Optical Society of America, Los Angeles, Calif., 2017), p. Th3I.1 (hereinafter, "Keeler 2017"), the entirety of which is hereby incorporated herein by reference.

Outside of the modulator, the optical field may exist in a standard TE or TM mode, but within the modulator, the mode changes to a hybrid plasmonic/photonic mode, even in the unbiased state. As the permittivity in the accumulation layer approaches zero, the modal confinement in this layer is strongly enhanced, offering possibilities of both phase modulation and amplitude modulation. This phenomenon is discussed, for example, in Keeler 2017 and in Campione 2017.

Under biased conditions, the mobility of the TCO material is a factor determining the electric field level within the accumulation layer; higher mobilities generally lead to larger field enhancement, which can produce more modulation depth in both phase modulation and amplitude modulation.

The dielectric permittivity $\varepsilon_{Drude}$ of the thin-film TCO can be described using the Drude $$\varepsilon_{Drude} = \varepsilon_\infty - \frac{\omega_p^2}{\omega(\omega + i\gamma)} \tag{1}$$

where $\varepsilon_\infty$ is the high frequency limit of the permittivity, $\omega_p$ is the plasma frequency, and $\gamma$ is the damping factor (also sometimes referred to as the damping rate or frequency, the collision rate or frequency, or the Drude gamma parameter). The plasma frequency is given by $$\omega_p = \sqrt{\frac{Nq^2}{\varepsilon_0 m_e}} \tag{2}$$

where N is the carrier concentration i.e., the electron concentration), q is the electron charge, an $m_e$ is the electron effective mass ($m_e = 0.21 m_0$ for both cadmium oxide and indium oxide), with $m_0$ the mass of an electron. The damping factor $\gamma$ is given by $$\gamma = \frac{q}{\mu m_e} \tag{3}$$

where µ is the material mobility.

In the unbiased state, the transparent conductor has a uniform, background carrier concentration throughout the film resulting in a material that behaves like a low-loss dielectric for wavelengths shorter than the ENZ wavelength.

But when a voltage is placed across the device, the carriers accumulate at the transparent-conductor/gate-dielectric interface, creating an accumulation layer having an increased carrier concentration. This increased carrier concentration results in a blueshift of the ENZ wavelength (i.e., a shift toward shorter wavelength values). At high enough carrier concentrations, it also causes the material to undergo a transition to metallic behavior. In the metallic state, the permittivity of the material has an increased imaginary part, and it exhibits stronger optical modulation effects than it does at the unbiased ENZ wavelength.

In operation, it is desirable to increase the carrier accumulation enough for the resulting blueshift to bring the ENZ wavelength near the optical carrier wavelength of, e.g., 1.55 µm. (Unless stated otherwise, optical wavelengths reported here are vacuum wavelengths.) As the ENZ wavelength approaches the target wavelength, there is a strong enhancement in modal confinement in the accumulation layer. Because of its hybrid plasmonic nature within the modulator section of the waveguide, the strongly confined propagating optical signal is susceptible to changes in its propagation constant (proportional to the real part of the permittivity) and absorption coefficient (proportional to the imaginary part of the permittivity). These changes can be utilized to effectuate phase modulation and amplitude modulation, respectively.

Indium oxide is an example of an ENZ material. The Drude model parameters for unbiased indium oxide are given by Table 1:

TABLE 1

| $\varepsilon_\infty$ | $\omega_p$ (rad/s) | $\gamma$ (rad/s) |
|---|---|---|
| 3.6 | $7.00 \times 10^{14}$ | $3.00 \times 10^{14}$ |

The Drude model parameters for biased indium oxide are given by Table 2:

TABLE 2

| $\varepsilon_\infty$ | $\omega_p$ (rad/s) | $\gamma$ (rad/s) |
|---|---|---|
| 3.4 | $2.31 \times 10^{15}$ | $3.05 \times 10^{14}$ |

Indium oxide, with a static carrier concentration density of about $10^{19}$ cm$^{-3}$, has a mid-infrared plasma frequency. However, a suitable bias can cause an accumulation region to form near the interface with the gate dielectric. The electron density in the accumulation layer can reach approximately $10^{21}$ cm$^{-3}$, which is sufficient to blue shift the ENZ crossing to a near-infrared wavelength.

We have observed similar behavior in cadmium oxide (CdO). CdO is a known ENZ material.

The Drude model parameters for unbiased cadmium oxide are given by Table 3:

TABLE 3

| $\varepsilon_\infty$ | $\omega_p$ (rad/s) | $\gamma$ (rad/s) |
|---|---|---|
| 5.5 | $1.23 \times 10^{15}$ | $1.77 \times 10^{13}$ |

The Drude model parameters for biased cadmium oxide are given by Table 4:

TABLE 4

| $\varepsilon_\infty$ | $\omega_p$ (rad/s) | $\gamma$ (rad/s) |
|---|---|---|
| 5.5 | $2.85 \times 10^{15}$ | $3.35 \times 10^{13}$ |

Figure 5:
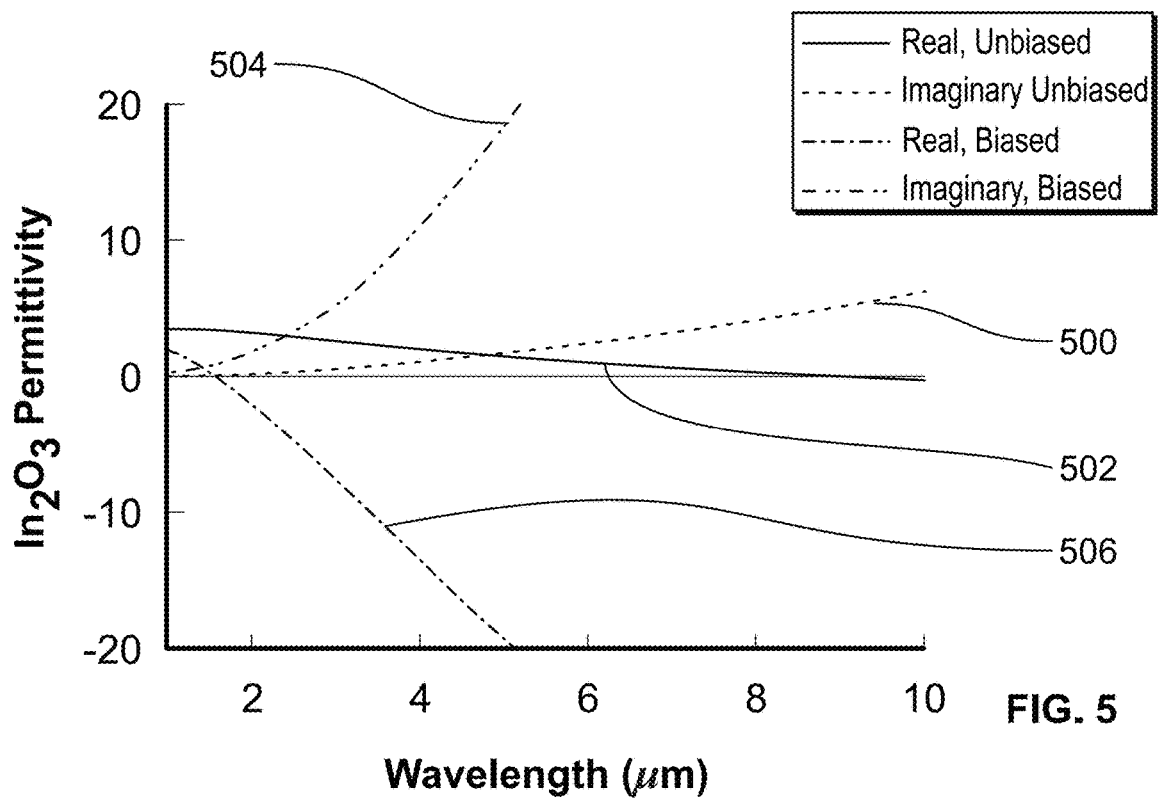
FIGS. 5 and 6 are plots of the permittivity of indium oxide and of cadmium oxide according to a Drude model.
Figure 6:
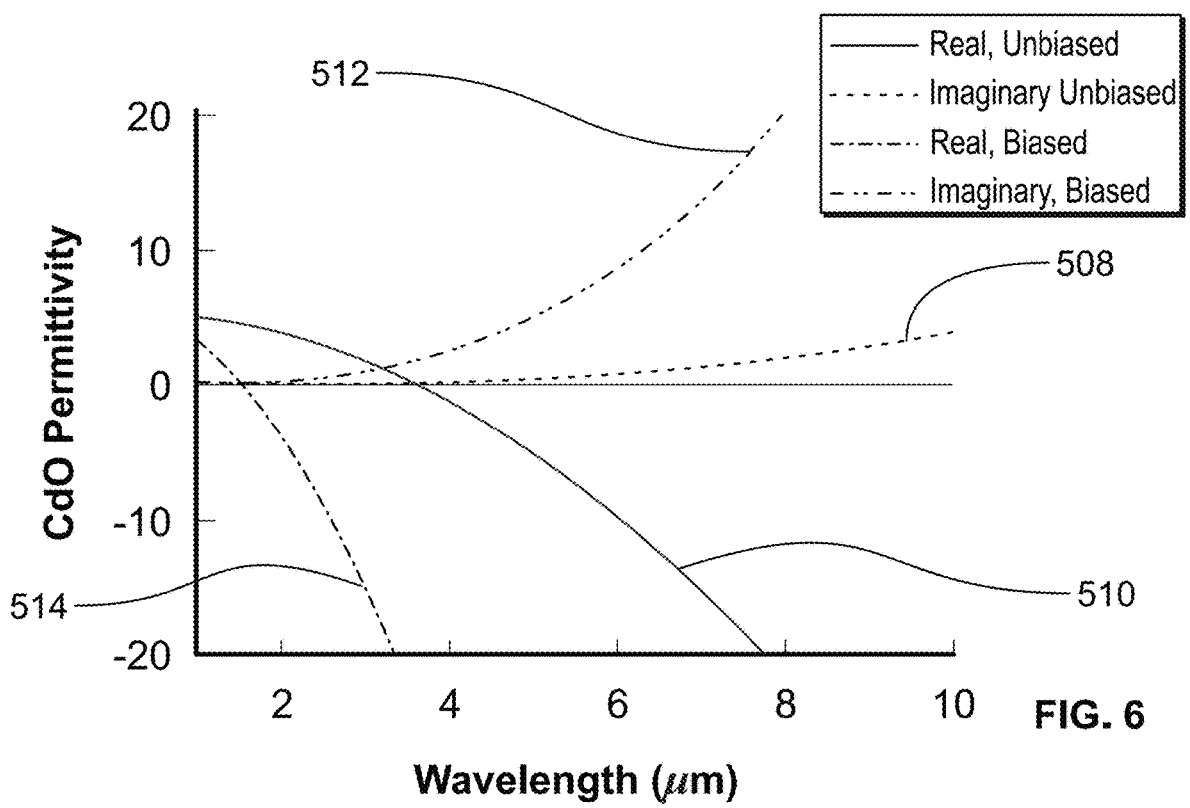

FIGS. 5 and 6 are plots of the modeled permittivities of indium oxide and CdO, respectively, using the Drude model parameters listed above. The permittivities are plotted versus wavelength. In FIG. 5, curves 500 and 502 respectively represent the imaginary part and the real part of the indium oxide permittivity in the unbiased state. Curves 504 and 506 respectively represent the imaginary part and the real part of the indium oxide permittivity under bias. Similarly, curves 508 and 510 of FIG. 6 respectively represent the imaginary part and the real part of the CdO permittivity in the unbiased state. Curves 512 and 514 respectively represent the imaginary part and the real part of the CdO permittivity under bias.

It will be understood from the figure that in the unbiased state, the indium oxide permittivity has an ENZ crossing at 8.8 µm, and it behaves as a dielectric at 1.55 µm. In the unbiased state, the CdO permittivity has an ENZ crossing at 3.6 µm, and it also behaves as a dielectric at 1.55 µm.

With further reference to the figure, it will be seen that under bias, both of the ENZ crossings are shifted to 1.55 µm, which, as noted, is an operating wavelength of particular interest. Under bias, the imaginary part of the CdO permittivity at 1.55 µm is 0.15, whereas the corresponding value for indium oxide is 0.85.

The lower value for the imaginary part of the CdO permittivity indicates that under the model, cadmium oxide is expected to exhibit less loss than indium oxide at 1.55 µm when under bias. However, other factors are at work: Biasing the transparent conductor causes an accumulation layer about 1 nm thick to form next to the gate dielectric. A large electric field is confined within this accumulation layer. This field leads to optical absorption that is not taken into account by the assumptions that underlie the plots of FIGS. 5 and 6.

We performed FDTD simulations to compare ENZ amplitude modulators having similar designs but respectively using indium oxide and cadmium oxide transparent conductor films. The designs were similar to the design shown in FIG. 1A.

As modeled, the modulator was 5 µm long. It was integrated directly with a passive silicon ridge waveguide 290 nm in height and 400 nm in width on a silicon-on-insulator wafer. The integrated MOS-like structure included a doped silicon layer as a lower contact, a hafnium dioxide gate dielectric layer 5 nm thick, a 10-nm-thick transparent conductor film (of, respectively, indium oxide or cadmium oxide) acting as the gate-tunable ENZ layer, and a 200-nm-thick metal gate contact of gold.

Hafnium dioxide was selected as the gate dielectric for its high dielectric constant, which is substantially greater than that of silicon dioxide.

Under bias at 1.55 µm, our simulations predicted a peak confined field of 11.5 V/m for indium oxide and 38.6 V/m for CdO. The optical absorption in the accumulation layer has a quadratic dependence on the electric field amplitude. From this, it can be understood why stronger absorption would be seen in the cadmium oxide device.

Figure 7:
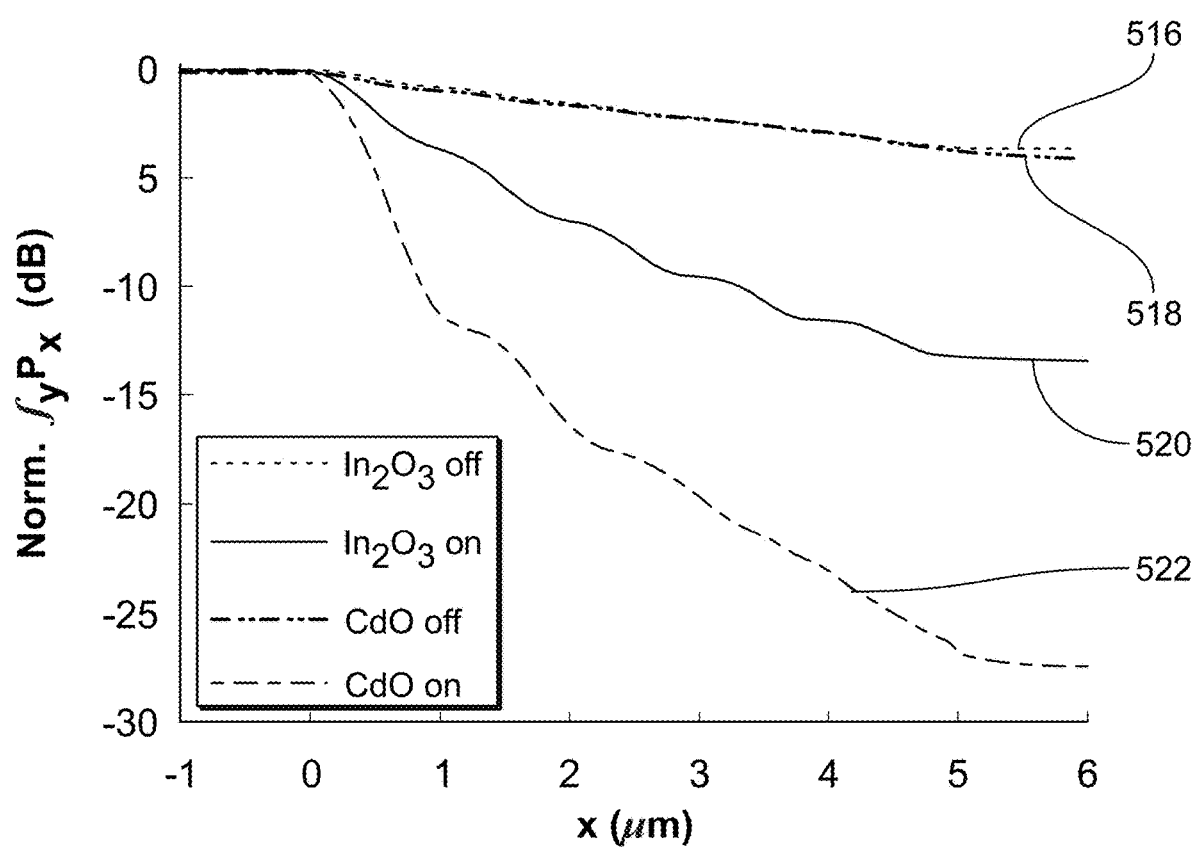
FIG. 7 is a plot, obtained from numerical simulations, of power versus propagation distance for the integrated power propagating through an example device of the kind described here and operated as an amplitude modulator.

FIG. 7 is a plot of the integrated power propagating through the device as a function of propagation distance at a wavelength of 1.55 µm, as predicted by our simulations. Curves 516 and 518 are respectively the indium oxide and CdO profiles in the unbiased state, and curves 520 and 522 are respectively the corresponding profiles under bias. It will be understood from the figure that the CdO device exhibits the greater modulation depth. It may be inferred from the figure that a modulator using CdO can achieve 5 dB modulation in a distance as short as 1 µm.

Figure 8A:
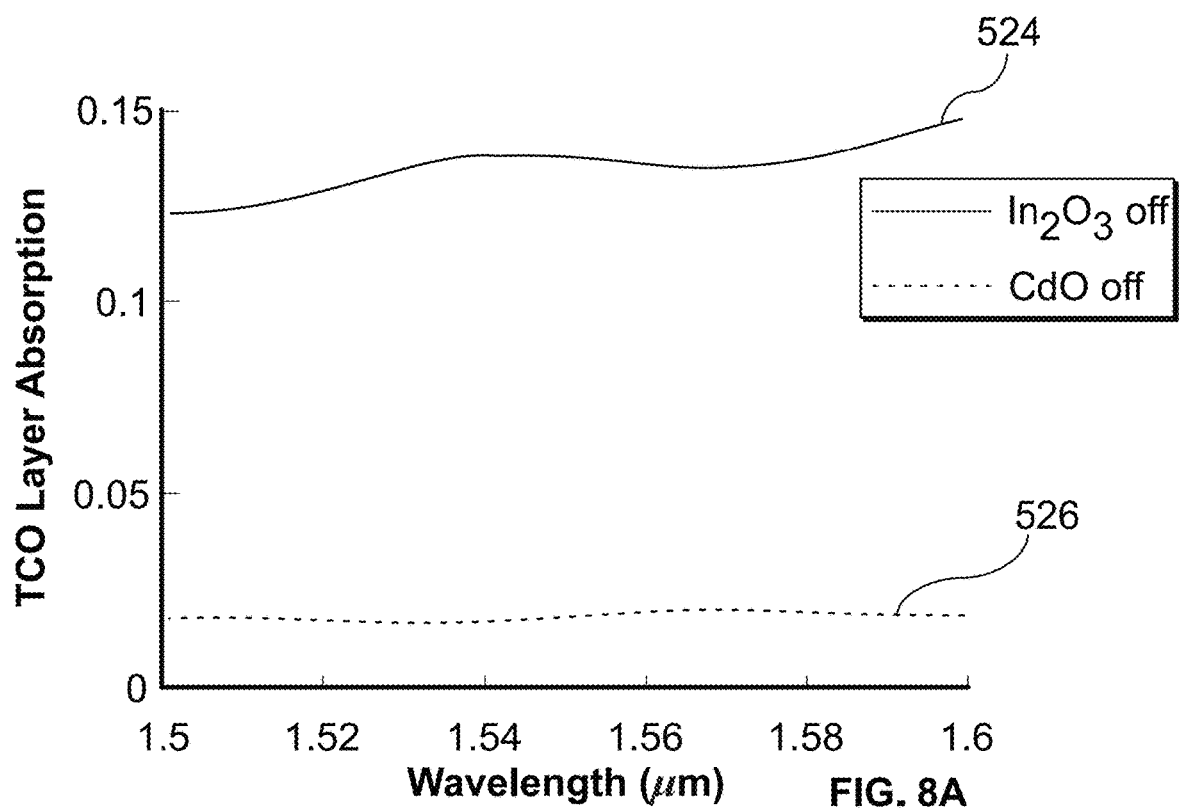
FIGS. 8A and 8B are comparative plots obtained from numerical simulations of an example device of the kind described here and operated as an amplitude modulator.
Figure 8B:
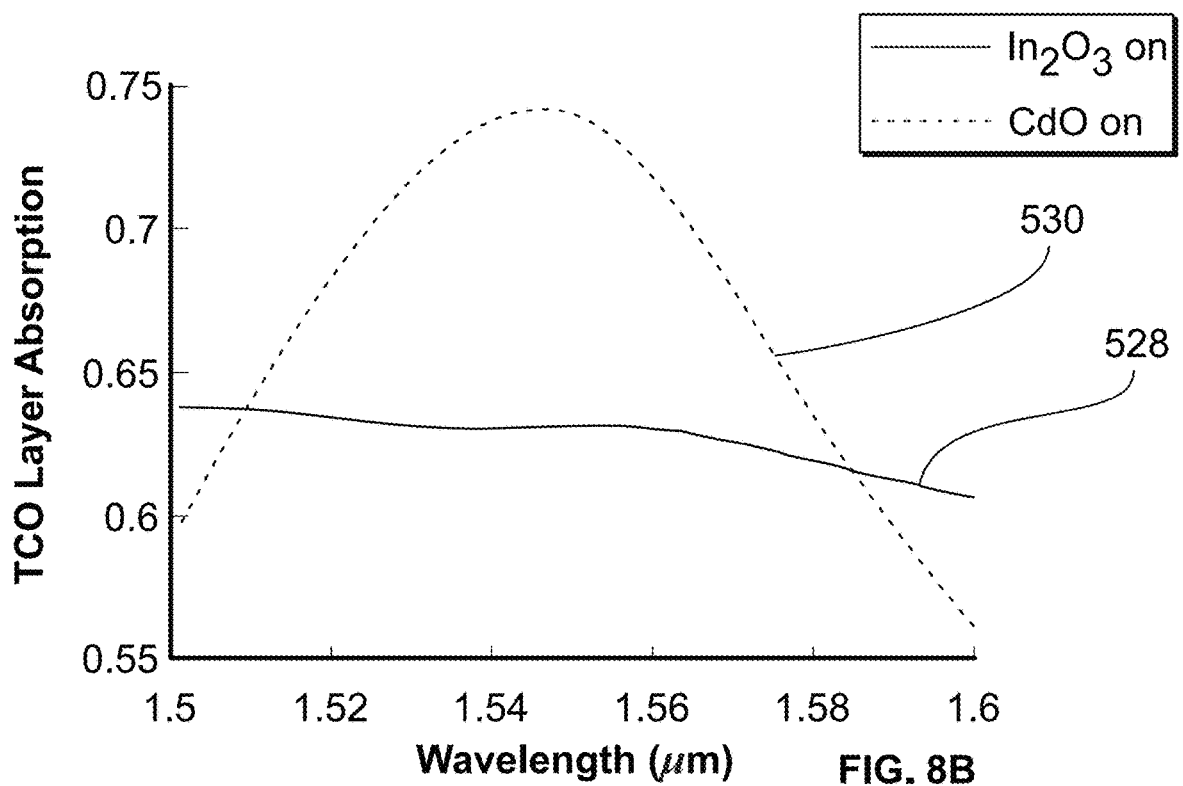

FIG. 8A is a plot of the simulated optical absorption per unit length in the unbiased indium oxide layer (upper curve 524) and unbiased CdO layer (lower curve 526). FIG. 8B is a plot of the simulated optical absorption per unit length in the biased indium oxide layer (lower curve 528) and biased CdO layer (upper curve 530). It will be seen that the CdO film absorbs less light than the indium oxide film when unbiased, but that it absorbs more light when under bias. It will also be seen that the CdO response is distinctly peaked at 1.55 µm.

Figure 9:
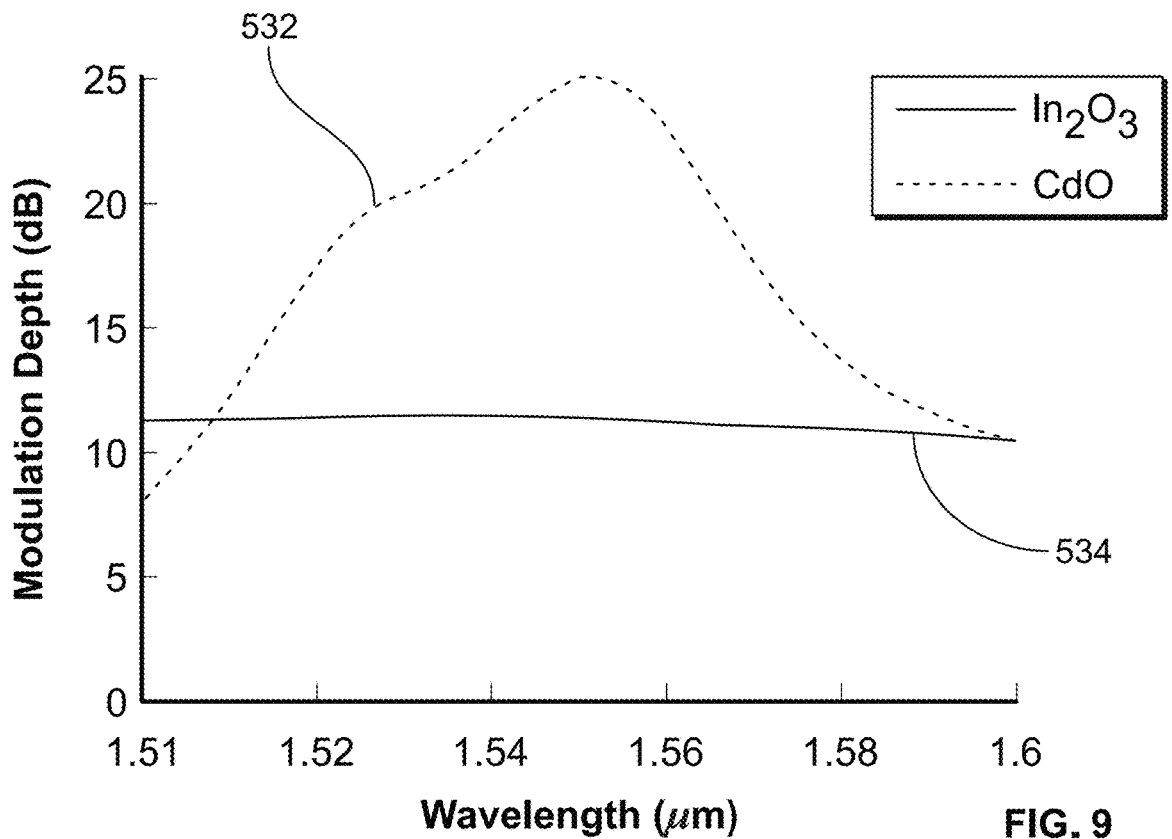
FIG. 9 is a plot, obtained from numerical simulations, of modulation depth versus wavelength for an example device of the kind described here and operated as an amplitude modulator. Two curves are presented, one for a transparent conductor of cadmium oxide, and the other for a transparent conductor of indium oxide.

FIG. 9 is a plot of the modulation depth as a function of wavelength for the simulated CdO modulator (curve 532) and indium oxide modulator (curve 534). It will be understood from the figure that the CdO modulator exhibits a peak modulation depth of 25 dB at 1.55 µm, with a steep decrease to 8 dB at 1.5 µm and 11 dB at 1.6 µm.

We attribute the narrow-band behavior to high carrier mobility in CdO (which leads to lower losses), and to the strong electric field confinement near the ENZ point. Despite the frequency-selective response, we still observe extinction ratios greater than 20 dB (or equivalently, greater than 4 dB/µm) over a bandwidth of 35 nm in the CdO device.

In summary, we have shown through numerical simulation that significant advantages can be realized in an ENZ plasmonic electro-optical amplitude modulator when CdO is used as the transparent conductor. The device design that served as the basis for our simulations was an unconventional design in which the bottom plate of the capacitive structure is not metallic but consists instead of a doped portion of the semiconductor waveguide. A known choice for the gate dielectric material, hafnium dioxide, was adopted in our simulations.

Figure 10:
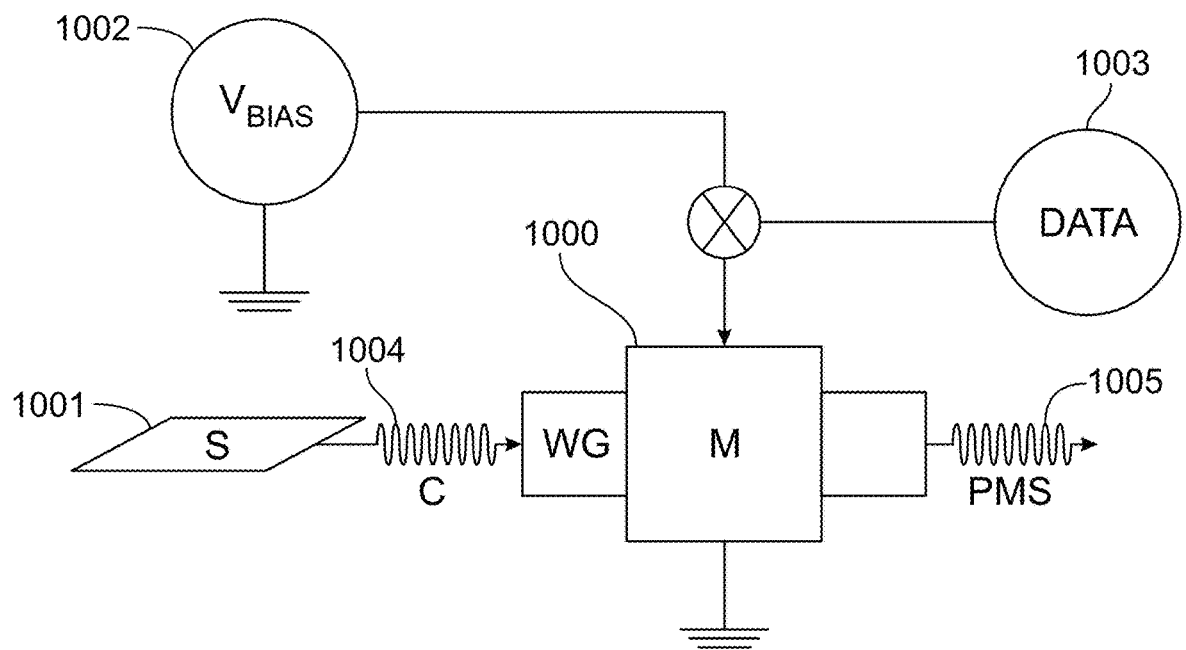
FIG. 10 is a notional diagram of an example modulator in operation within a system.

Operation of an ENZ modulator. FIG. 10 is a notional diagram of a modulator 1000, similar to the modulator of FIG. 4, while it is in operation within a system that includes optical source 1001, bias voltage source 1002, and data signal source 1003. An injected optical carrier 1004 is seen entering the waveguide from the lower left and exiting as beam 1005 at the upper right.

In operation, the time-dependent bias voltage (as modulated by the data signal) is applied between the base contact and the gate contact of the modulator, resulting in the bias voltage being applied across the transparent conductor and the gate dielectric.

Advanced materials and processing for improving modulator performance. We believe that a modulator using CdO can be further improved with a different choice of gate dielectric material. The reason is that even without bias, population of mid-bandgap and higher-lying interface states by electrons leads to a significant carrier accumulation at the interface between the CdO layer and the hafnium dioxide gate dielectric. This carrier accumulation interferes with the bias-induced accumulation and depletion of carriers needed for the modulator to operate.

CdO is unusual (although not unique) in having a band structure that energetically favors the populating of the interface states. More specifically, the charge neutrality level (CNL) of CdO (roughly, the energy of the highest filled interface state at the transition between a negative and a positive interfacial surface charge) lies above the bottom of the conduction band. This causes the Fermi level to be pinned above the conduction band edge, which, in turn, allows the interface states to be heavily populated.

We believe that other factors being equal, the more this interfacial carrier accumulation can be suppressed, the better the resulting modulator will perform.

The undesired carrier accumulation could be suppressed by reducing the interfacial density of states. (The density of states, roughly speaking, is the number of available states per unit energy.) The interface states arise, in part, because cadmium oxide and hafnium dioxide are crystallographically dissimilar. As a consequence, the crystal symmetry of cadmium oxide is broken at the interface. We believe that by replacing hafnium dioxide with a different gate dielectric material that is crystallographically similar to cadmium oxide, the interfacial density of states can be reduced, leading to less of the undesired carrier accumulation and to better modulator performance.

Magnesium oxide (MgO) is such a material. It has a cubic crystal structure with a lattice constant of 4.212 Å. Cadmium oxide likewise has a cubic crystal structure, with a lattice constant of 4.6958 Å. Cadmium oxide and magnesium oxide can be deposited sequentially in a sputtering tool without a break in the vacuum.

As noted above, the transparent conductor and the gate dielectric adjacent to it can be regarded as constituting a bilayer. As also noted, the bilayer is oriented in some embodiments with the transparent conductor adjacent to the semiconductor waveguide, and in other embodiments with the gate dielectric adjacent to (a doped portion of) the semiconductor waveguide. We believe that a superior modulator can be made, with either bilayer orientation, by constituting the bilayer with cadmium oxide for the transparent conductor and magnesium oxide for the gate dielectric.

It should be noted in this regard that a composite gate dielectric may be used, in which a layer of magnesium oxide forms the interface with CdO, and other dielectric materials are added to the side of the magnesium oxide layer opposite to the interface.

As we noted above, the imaginary part of the CdO permittivity ("Im ε") under bias at 1.55 µm is 0.15, whereas the corresponding value for indium oxide is 0.85. Although the relatively low value for the biased Im ε in CdO suggests there would be less loss under bias in CdO than in indium oxide at 1.55 µm, we discovered that the opposite occurs because of the enhanced optical confinement within the region most effective for modulation.

More generally, we refer again to the prediction of the Drude model relating the permittivity $\varepsilon_{Drude}$ to the collision rate γ, the plasma frequency $\omega_p$, the optical frequency ω, and the infinite frequency permittivity $\varepsilon_{inf}$.

$$\varepsilon_{Drude}=\varepsilon_{inf}-\omega_p^2/(\omega^2+i\gamma\omega)$$

It will be evident from the above expression that increasing the collision rate γ will increase Im ε, and vice versa. The naïve inference from this increase in Im ε is that a TCO with a smaller Drude gamma parameter γ will absorb less light. However, our discovery suggests the opposite; i.e., it suggests that reducing γ will in fact increase the absorption under bias in a modulator such as the one described here.

For an amplitude modulator, a useful figure of merit in this regard is the extinction per unit length. For example, the modulator described in the example below, using indium oxide ($In_2O_3$) for the TCO layer, achieved more than 6 dB of extinction in a propagation length of 4 µm, corresponding to a figure of merit of greater than 1.5 dB/µm. By substituting cadmium oxide for indium oxide, we were able to achieve a further improvement, by a factor of 2.5, in the same figure of merit.

By some measurements, the collision rate (i.e., the Drude gamma parameter) of indium oxide is $3\times10^{14}$ rad/s. Comparable measurements for indium-tin oxide (ITO) yield a greater collision rate of $7\times10^{14}$ rad/s, and for cadmium oxide they yield a substantially smaller collision rate of $3\times10^{13}$ rad/s. (The collision rate is typically obtained using data from ellipsometry measurements, from which the desired value is obtained by curve fitting to a Drude model. Hall mobility measurements may be used as an alternative to ellipsometry measurements.)

Our findings predict that, at least for the device geometry described here, the choice of TCO materials with relatively small collision rates will lead to relatively high extinction per unit length and as a result, to relatively high achievable modulation depth for a given propagation length. In particular, improvements in performance are expected when the collision rate is smaller than $3\times10^{14}$ rad/s or is smaller (irrespective of how it is measured) than that of indium oxide. Cadmium oxide is one example of a material having such a small collision rate.

We believe that our predictions are valid for a range of optical wavelengths, spanning at least from 0.8 µm to 2 µm. In particular, we believe they are valid for two wavelengths of special interest for optical communication, namely 1.55 µm and 1.3 µm, and for the range of wavelengths between them.

One important benefit of increasing the extinction per unit length stems from the fact that the type of modulator described here is fundamentally a capacitive device. That is, the active modulation region is enclosed between the plates of a capacitor, and the bias field is applied between those plates. The device consequently has an intrinsic capacitance that limits its achievable bandwidth. (By "intrinsic" is meant that the capacitance is intrinsic to the device design.)

This limitation has been a factor in the performance characteristics of similar devices that have been reported in the technical literature. The reported switching speeds of ENZ modulators based on ITO have generally been in the kilohertz to low megahertz range. These speeds have not, to our knowledge, approached 1 GHz.

The bandwidth limitations of the reported devices may be attributable, in part, to carrier trapping at the ITO surface. However, we believe that these limitations are also at least partly attributable to the intrinsic capacitance of these devices.

The intrinsic capacitance scales linearly with the optical propagation length within the active modulation region. But a given amount of extinction under bias (thus a given modulation depth) can be achieved in a shorter propagation length if the extinction per unit length is increased. In turn, reducing the propagation length reduces the intrinsic capacitance and (provided interfacial charge trapping is not the dominant mechanism) increases the bandwidth of the device.

Accordingly, it will be advantageous, for at least some applications, to operate the modulator with a propagation length in the active modulation region of only 5 µm or even less.

The example device described below, which was based on indium oxide, achieved a bitrate of 2.5 Gb/s. Accordingly, we believe that modulators embodying the principles described here can readily achieve modulation bitrates of 500 Mb/s and more, and can even achieve rates substantially greater than 1 Gb/s.

It is important to note that in the example below, the indium oxide was sputter deposited, but the subsequent annealing step for ten minutes at 600° C. is believed to have improved the interface with the gate dielectric and thereby to have reduced possible trapping effects.

As is well known in the art, annealing the indium oxide tends to increase its concentration of oxygen. Because oxygen vacancies increase the conductivity and the Drude-model collision rate of the material, as-deposited materials should be deposited with relatively low oxygen vacancy concentrations to ensure that the Drude-model collision rate after annealing remains below the target value of $3\times10^{14}$ rad/s. It is known in the art that flowing oxygen during the sputter deposition of the indium oxide layer can be used to control the oxygen vacancy concentration in the as-deposited film.

It should also be noted that indium oxide and cadmium oxide are only two examples of transparent conductor materials with relatively low collision rates. Other suitable materials are also within scope of the invention. For example, titanium nitride is a known transparent conducting material. Indium oxide and cadmium oxide are examples of so-called "transparent conducting oxide" (TCO) materials. However, not all transparent conductors are oxides, strictly speaking. Accordingly, the terms "transparent conducting oxide" and "TCO" as they might be used herein should be understood to encompass not only oxides as strictly construed, but also transparent conducting nitrides and oxynitrides and the like.

Plasmonic Electro-Optical Modulators for Phase Modulation

Our designs for non-resonant plasmonic electro-optical modulators are also useful for phase modulation. We designed and numerically modeled a non-resonant plasmonic electro-optical phase modulator. The operating principle of the device is field-effect carrier-density tuning in a TCO film integrated on top of a passive waveguide of, e.g., silicon.

The modulator that we modeled in our study is a silicon waveguide modulator, 5 µm long, with a height of 340 nm, built on a silicon-on-insulator substrate. The tunable 10 nm-thick TCO ENZ layer is integrated on top of the silicon waveguide with a connection to a metal pad forming a base electrical contact. The model was based on CdO as the TCO material. A gate dielectric with a thickness of 10 nm is sandwiched between the TCO layer and a 200-nm thick top gate metal contact. This device topology uses a fabrication process that is CMOS compatible and can support phase modulation of both transverse-electric (TE) and transverse-magnetic (TM) modes.

Figure 11:
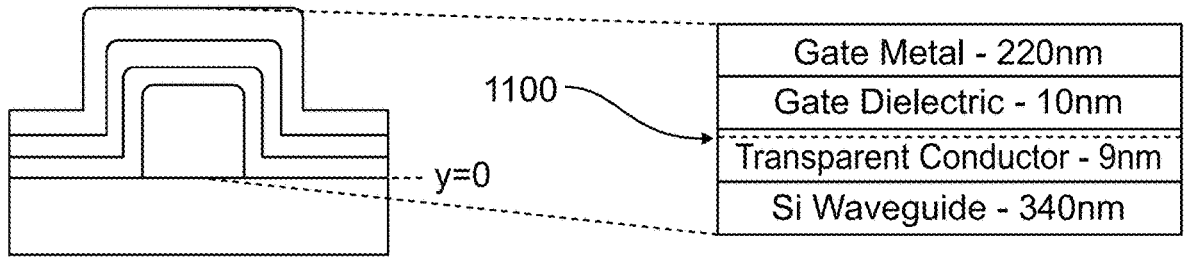
FIG. 11 is a schematic cross-sectional view of an example plasmonic electro-optical modulator for phase modulation.

A schematic cross section of the modeled phase modulator is provided in FIG. 11. An accumulation layer 1100 is indicated in the figure.

For comparison, reference is usefully made to the ENZ amplitude modulator using indium oxide that was reported in M. G. Wood et al., *Optica* 5, 4 (2018) (hereinafter, "Wood 2018"), the entirety of which is hereby incorporated herein by reference. Although the model $In_2O_3$ device reported here has layers in a different order relative to the Wood 2018 device, the two structures lead to similar results for both amplitude and phase modulation. (Specifically, the Wood 2018 device placed the gate dielectric in direct contact with a conductive doped surface layer of the silicon waveguide and deposited the TCO over the gate dielectric. Thus, the TCO-dielectric bilayer was flipped relative to the structure discussed below.)

In the coordinate system that we have adopted, the propagation direction is along the z-axis, the y-axis defines the growth direction normal to the substrate, and the x-axis defines the transverse direction parallel to the substrate. The y-component Ey of the electric field is the dominant field component under TM excitation.

Several figures of merit are useful in modeling studies for evaluating the modulator performance as parameter values are varied. One such figure is the phase change $\Delta\Phi_{E_y}$ that the modulator produces in Ey when the modulator goes from the unbiased to the biased state.

In another useful figure of merit, which we simply refer to as "FOM", the above phase change is normalized to the optical loss in the modulator. That is, $$FOM = \frac{\Delta\Phi_{E_y}}{\text{loss}}.$$

Two-dimensional FDTD simulations of the phase modulator were performed versus CdO accumulation layer carrier concentration for a 5 μm long modulator under TM mode excitation into the silicon waveguide.

Figure 12:
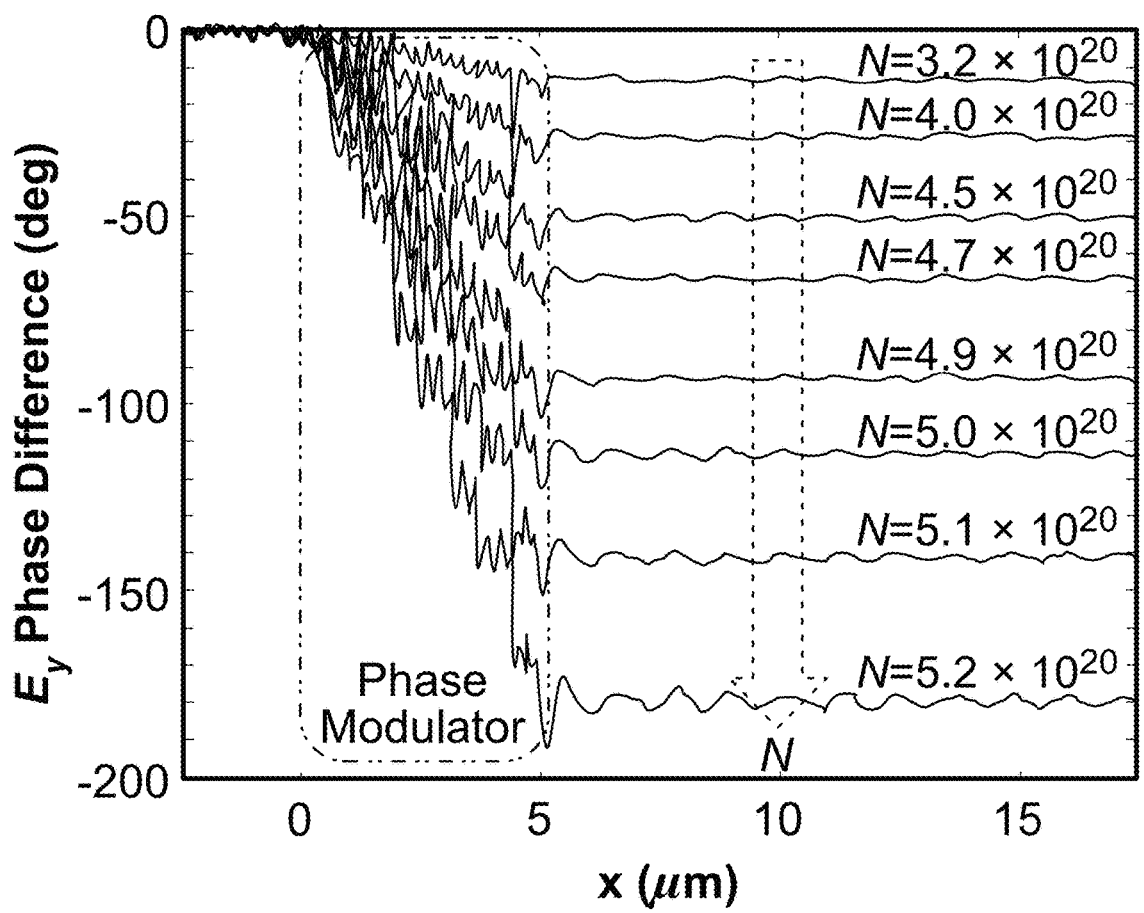
FIG. 12 is a graph, obtained by numerical modeling, of the phase change $\Delta\Phi_{Ey}$ at the target wavelength of 1.55 μm as a function of position within an example phase modulator. Eight plots are provided for different respective carrier concentrations.

FIG. 12 shows the phase change $\Delta\Phi_{Ey}$ at $\lambda$=1.55 μm for varying carrier concentrations. In the plot, the values for $\Delta\Phi_{Ey}$ are averaged over the thickness of the 340-nm silicon waveguide. The phase in the biased cases is seen to lag the unbiased case. As the carrier concentrations increase, so does the phase difference with a flat response outside of the ENZ modulator.

The 5 μm long modulator yields phase shifts of $-92.9°$ and $-178.1°$ (referenced 7.5 μm away from the modulator output) for carrier concentrations of $4.9\times10^{20}$ cm$^{-3}$ and $5.2\times10^{20}$ cm$^{-3}$, respectively.

Figure 13:
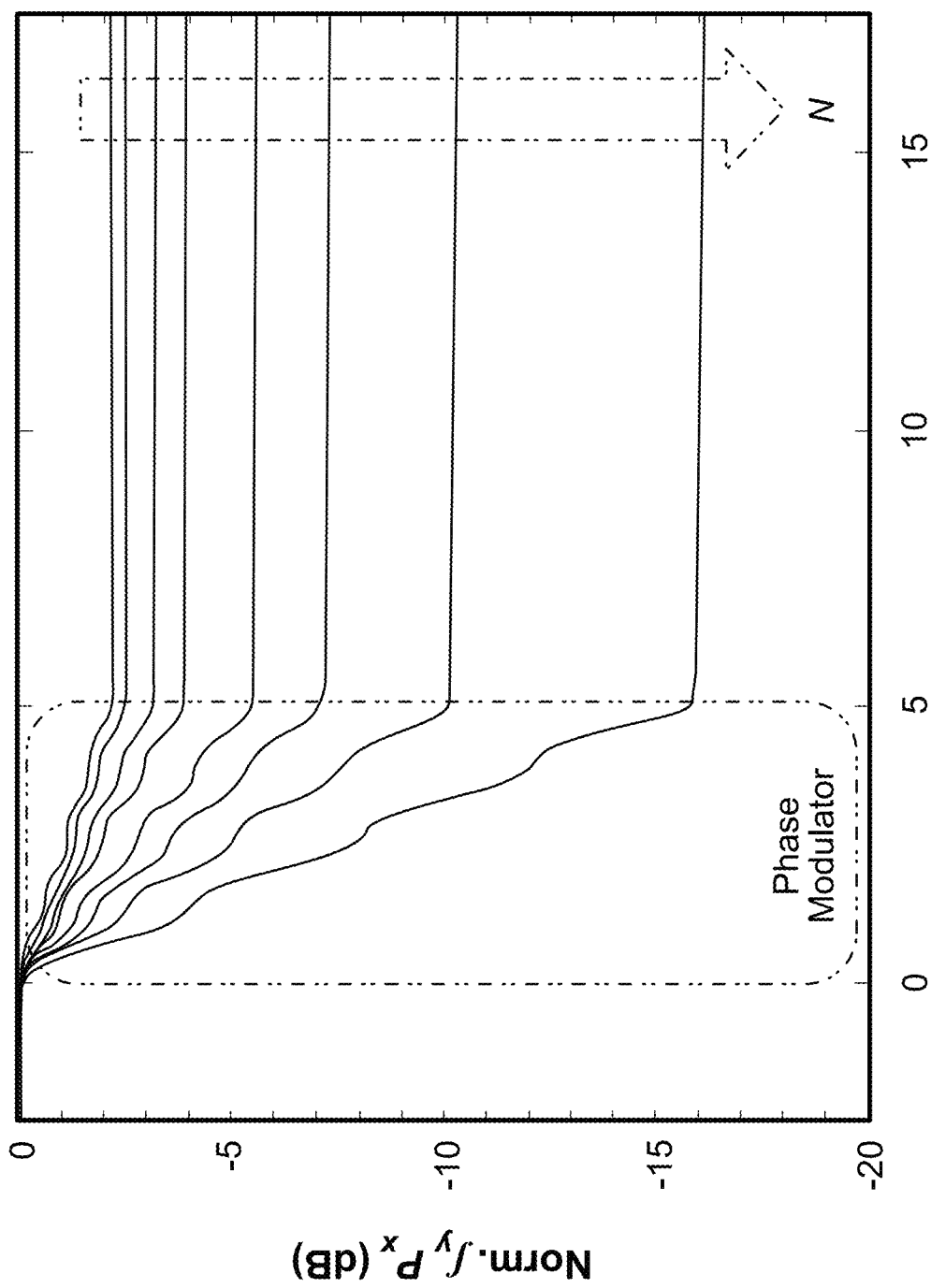
FIG. 13 is a graph, obtained by numerical modeling, of the optical power propagating along the waveguide of FIG. 12. The optical power is plotted as a function of position within the modulator. A separate plot is provided for each of the carrier concentrations of FIG. 12.

FIG. 13 shows the power propagating along the waveguide integrated over the y-direction for the various carrier concentrations shown in FIG. 12. A loss of $-5.58$ dB is incurred for a phase shift of $-92.9°$ (N=$4.9\times10^{20}$ cm$^{-3}$) with the loss increasing to $-16.0$ dB with a phase shift of $-178.1°$ (N=$5.2\times10^{20}$ cm$^{-3}$).

Figure 14:
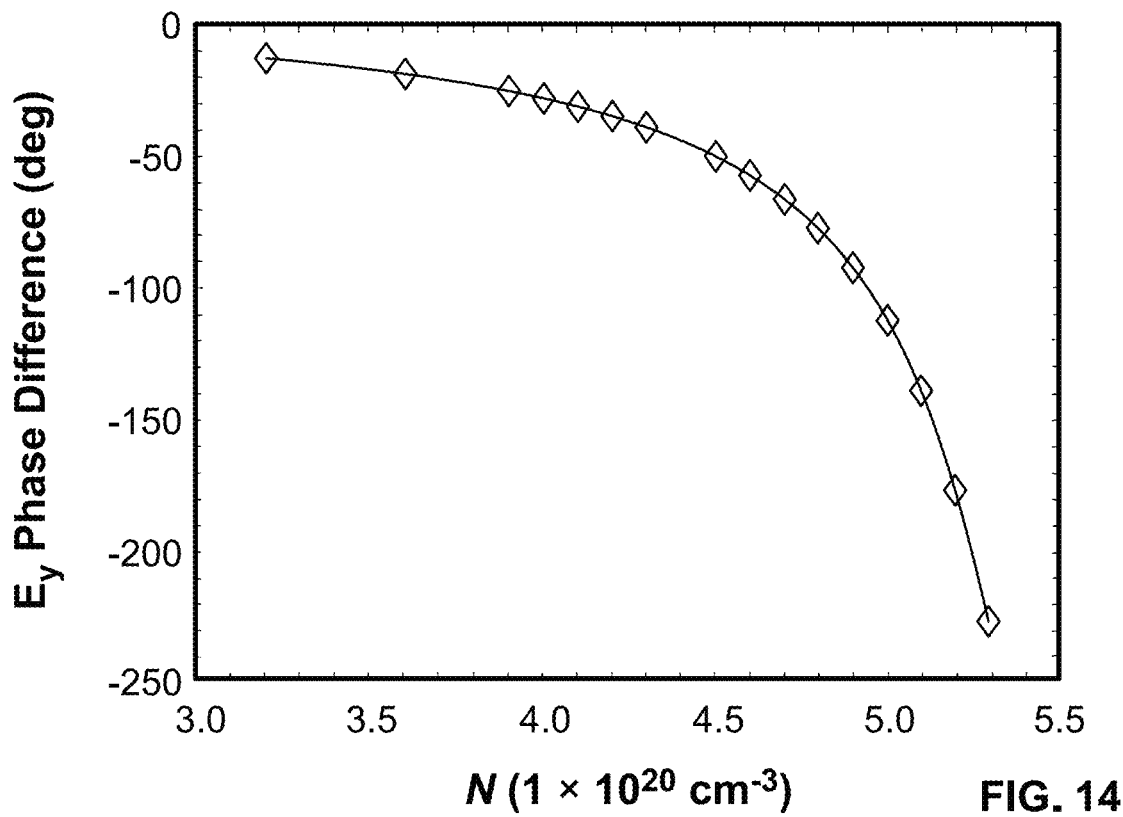
FIG. 14 is a graph, obtained by numerical simulation, of the phase change $\Delta\Phi_{Ey}$ at the target wavelength of 1.55 μm as a function of carrier density in the phase modulator of FIG. 12.

FIG. 14 shows the corresponding average phase difference at $\lambda$=1.55 μm versus accumulation layer carrier densities between $3.2$-$5.3\times10^{20}$ cm$^{-3}$ with resulting phase shifts of $-13.9°$ to $-229.8°$ across this range. (These values are referenced 7.5 μm from the output of the phase modulator). The phase shift response is seen to exhibit a linear dependence at lower doping concentration levels, but as the ENZ crossing point approaches the operating wavelength, the phase shift rapidly decreases. Since most phase shifter applications require low loss and less than about $2\pi$ radians (or about 360°) of phase shift, the phase modulator would be operated below the TCO ENZ point.

Figure 15:
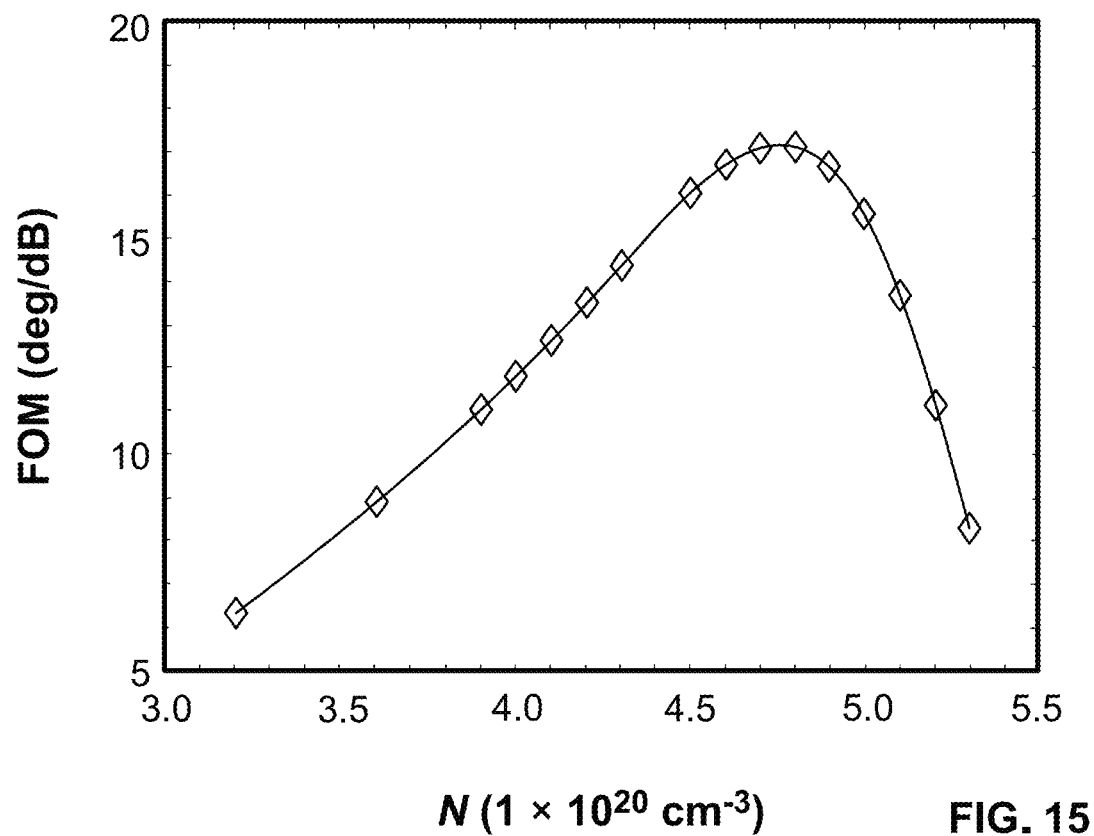
FIG. 15 is a graph, obtained by numerical simulation, of the FOM as a function of carrier density in the phase modulator of FIG. 12.

In FIG. 15, the FOM is plotted versus carrier density. The figure shows a peak of $17.1°$/dB at a carrier density of $4.8\times10^{20}$ cm$^{-3}$. For TCO carrier concentrations just below the ENZ crossing point, optical loss in the phase modulator increases rapidly, causing a drop in the FOM despite the larger phase shifts.

Our prediction of a peak FOM of $17.1°$/dB implies that a phase change of at least 90° can be achieved with no more than 7.5 dB of loss, and a phase change of at least 180° can be achieved with no more than 15 dB of loss.

FIG. 15 shows a FOM of about $15°$/dB at a carrier density of $5\times10^{20}$ cm$^{-3}$. At the same carrier density, FIG. 14 shows a phase delay of about 110° in a modulation length of 5 μm. These values imply that with no more than 10 dB of loss, a phase shift of 90° or more can be achieved within a modulator length of 10 μm or less. Thus, for example, 180° of phase delay could theoretically be achieved within a modulator length of 20 μm or less, with no more than 20 dB of loss.

Numerical Modeling of Mobility Effects on Phase Modulator Performance

The carrier mobility in the TCO layer has been shown to influence the electric field within the accumulation layer. Higher mobilities and lower losses tend to produce higher fields. This tendency is discussed, e.g., in Campione 2017, which was cited above.

The mobilities can vary considerably between different TCO materials. For example, the mobility in unbiased indium oxide has been reported as 27.9 cm$^2$/Vs, and under bias it is estimated at 27.5 cm$^2$/Vs. By contrast, the mobility in unbiased cadmium oxide has been reported as 474 cm$^2$/Vs, and under bias it is estimated at 250 cm$^2$/Vs. Mobility data are reported, e.g., in E. Sachet et al., *Nat. Mater.* 14, 414 (2015), hereinafter "Sachet et al.".

Using FDTD simulations, we performed a study of how carrier mobility affects the performance of a phase modulator. The unbiased and biased model parameters used in our study are consistent with the data reported by Sachet et al. Our study ranged over various values of the carrier concentration paired with various values of the gate voltage. Since we could not precisely predict the bias effects on the mobility over the full parameter space, we assumed a conservative estimate of the lowest biased state mobility, based on the date in Sachet at al., for all biased carrier concentrations.

The unbiased static carrier concentration of the TCO material was chosen to place the zero crossing of the real part of the permittivity at a wavelength above the target operational wavelength of 1.55 μm. A voltage across the device induces an accumulation layer at the top of the TCO layer near the gate dielectric and produces a blue shift of the ENZ point toward the target wavelength.

Our model was based on CdO as the TCO material. We modeled the accumulation layer as a 1-nm-thick layer with a fixed accumulation carrier density of $4.8\times10^{20}$ cm$^{-3}$. CdO is not meant to be limiting in this regard. In practice, other suitable high-mobility ENZ materials would be useful and are expected to lead to results similar to those for CdO. Although a material with a mobility as low as 50 cm$^2$/Vs, or even less, could potentially be useful, a "high mobility material" in this regard is a material with carrier mobility of at least 100 cm$^2$/Vs, and preferably at least 200 cm$^2$/Vs.

Outside the modulator, the optical field was described by a standard TE or TM mode, whereas inside the modulator, the mode changed to a hybrid plasmonic/photonic mode even when unbiased.

As the permittivity in the accumulation layer approaches zero, the modal confinement in that layer is strongly enhanced, leading to both phase and amplitude modulation. (See, e.g., Keeler 2017 and Campione 2017, both cited above.)

Under biased conditions, the mobility of the TCO material is a factor in determining the electric field level within the accumulation layer. Higher mobilities tend to produce larger field enhancements and deeper phase and amplitude modulation. (See, e.g., Campione 2017.)

In our modeling study, we investigated the phase shift, loss, and FOM as functions of the CdO mobility at the fixed accumulation carrier density of N=$4.8\times10^{20}$ cm$^{-3}$, which corresponded to an ENZ wavelength of 1.64 μm.

Figure 16:
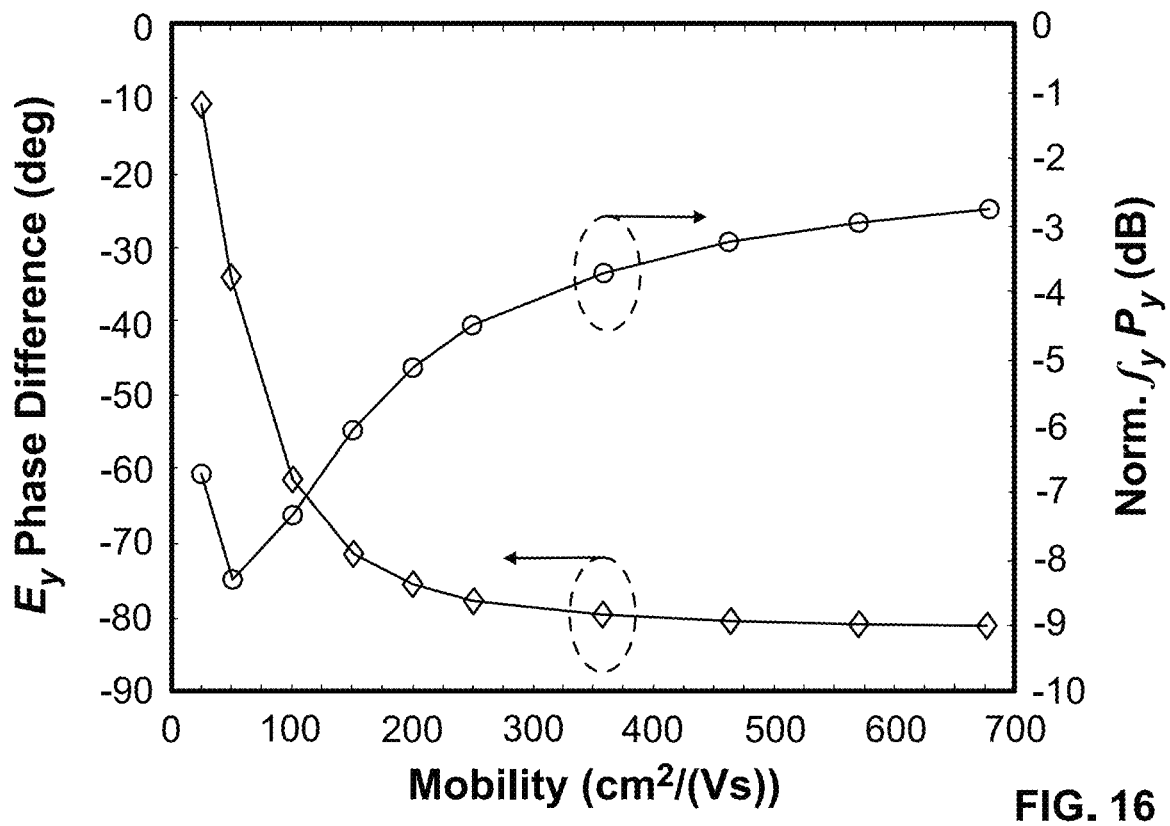
FIG. 16 is a graph of data generated by the numerical modeling of an example plasmonic electro-optical modulator operated as a phase modulator. The results show the dependence of the average Ey phase difference $\Delta\Phi_{Ey}$ and the dependence of the integrated optical power on carrier mobility in the TCO at a wavelength of 1.55 μm and a carrier concentration of $4.8\times10^{20}$ $cm^{-3}$.

FIG. 16 shows $\Delta\Phi_{Ey}$ (left-hand scale) and loss (right-hand scale) plotted against the accumulation layer mobility over a mobility range from 25 cm$^2$/Vs to 675 cm$^2$/Vs. Both of the plotted quantities are averaged by integrating in the y-direction of the phase modulator over the 340-nm waveguide thickness. Reference to the figure shows that at a relatively low mobility of 25 cm$^2$/Vs, there is produced only $-11.5°$ of average relative phase shift. The phase shift is seen to improve to $-76.1°$ when the mobility goes up to 200 cm$^2$/Vs.

As the mobility increases from 25 cm$^2$/Vs to 200 cm$^2$/Vs, the loss is seen to change from about $-7$ dB to about $-3$ dB. Accordingly, as seen in FIG. 17, FOM improves from very low values near a mobility of 25 cm$^2$/Vs to as much as $28.6°$/dB when the CdO mobility increases to 675 cm$^2$/Vs.

Figure 17:
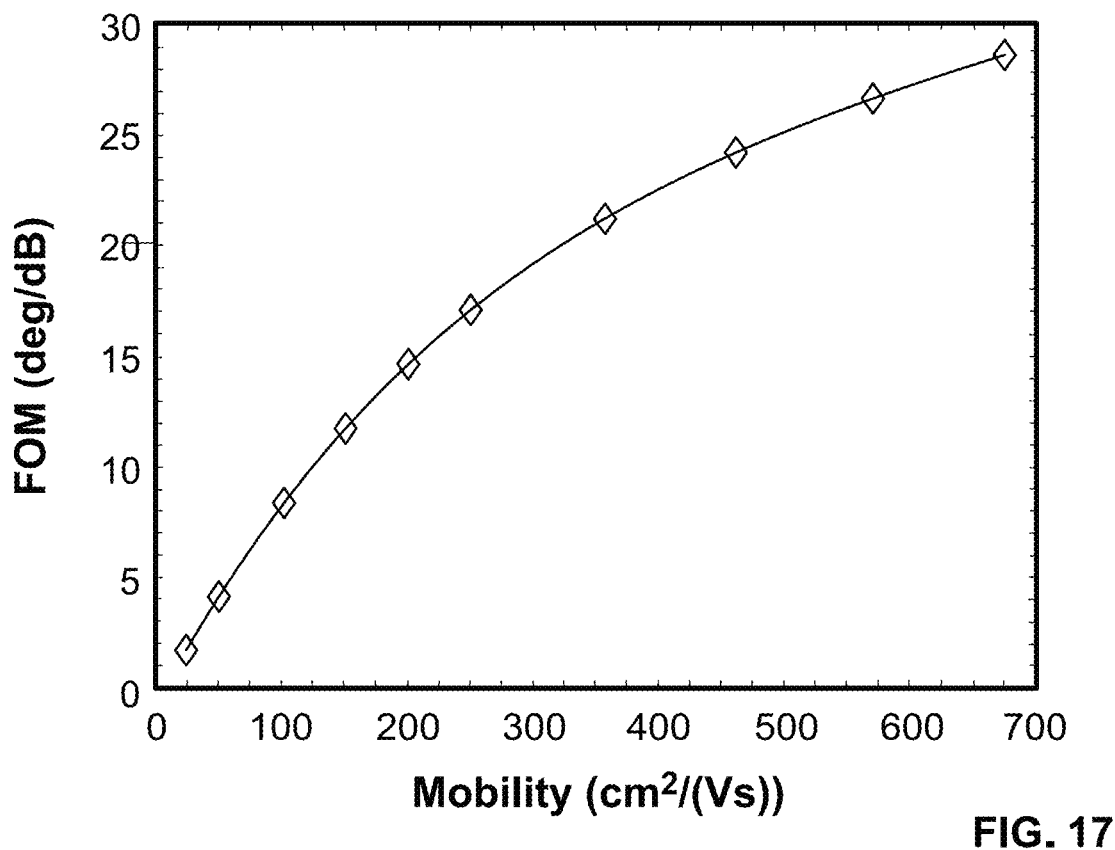
FIG. 17 is a graph showing the dependence of a phase modulator figure of merit FOM on the TCO mobility at a carrier concentration of $4.8\times10^{20}$ $cm^{-3}$.

Comparison of FIGS. 16 and 17 shows that taking the phase shift as the criterion, 100 cm$^2$/Vs is a convenient threshold demarcating a high-mobility regime, and taking FOM as the criterion, 200 cm$^2$/Vs is likewise a convenient threshold demarcating a high-mobility regime.

As seen in the figures, mobilities from 200 to 675 cm$^2$/Vs result in only minor changes in phase of about 5°, with −83.1° of phase shift for μ=675 cm²/Vs. The phase modulator loss generally decreases with higher mobility, since the phase modulator operates at a dielectric permittivity point below the ENZ crossing. For example, the loss is only about −2.8 dB at a mobility of 675 cm²/Vs. It should be noted in this regard that the higher mobility materials must still follow a Drude model response in the wavelength region of interest.

Figure 18:
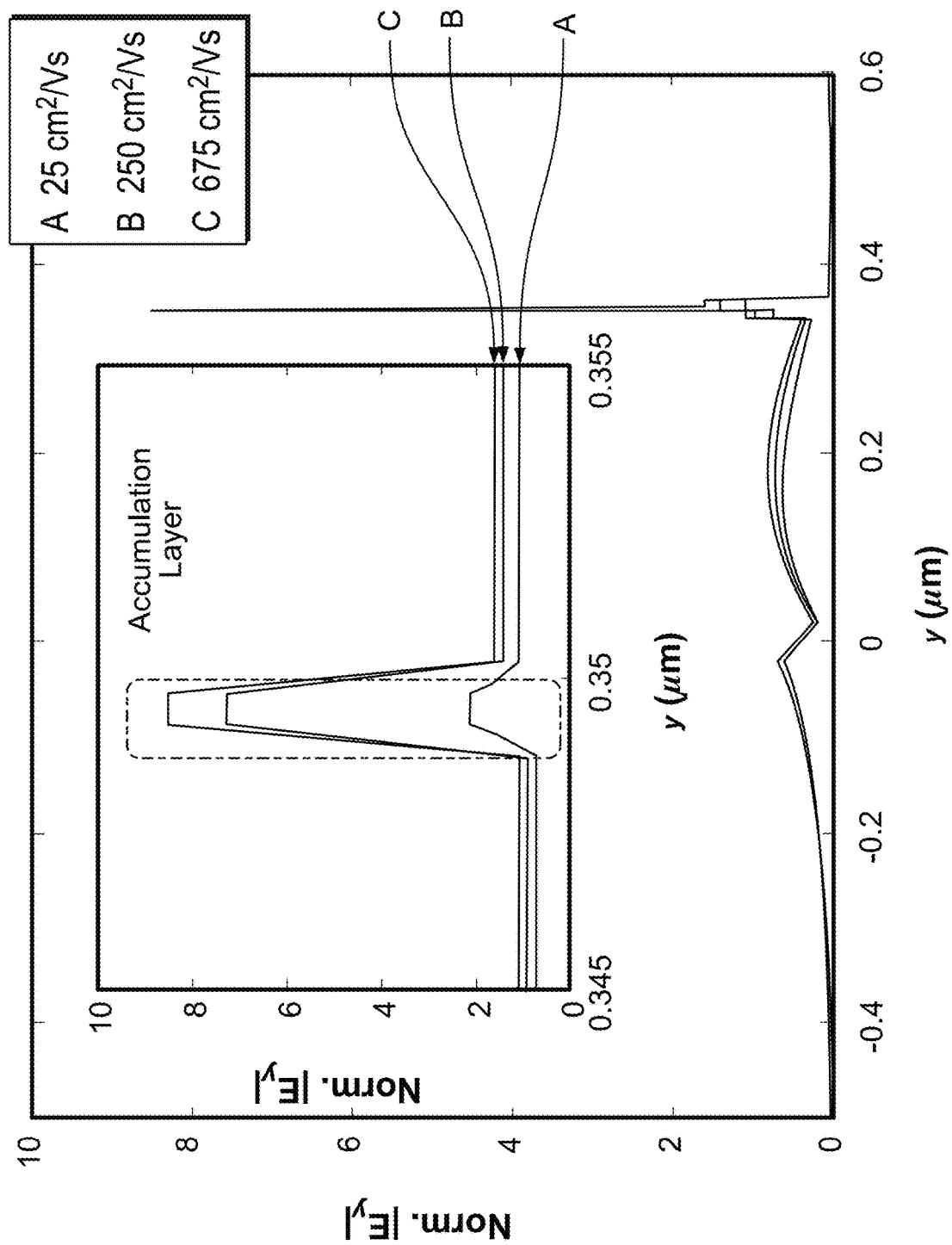
FIG. 18 is a plotted electric field profile in an example phase modulator, obtained through numerical simulation. The profile is taken through the vertical (i.e., in the y-direction) thickness of the device at a point halfway along the 5-μm length of the phase modulator. The plotted field quantity is |Ey|, normalized to the Ey field maximum at the input to the phase modulator at x=−0.1 μm. Three plots are provided at different values of the TCO mobility. The carrier concentration for all calculations was $4.8\times10^{20}$ $cm^{-3}$. As best seen in the inset to the figure, the peak in the electric field coincides with the 1-nm-thick TCO accumulation layer positioned between 0.349 μm and 0.35 μm.

At lower mobilities, there are smaller field concentrations in the accumulation layer and less modal confinement, hence smaller phase changes. This is shown in FIG. 18, where a vertical (i.e., in the y-direction) profile of Ey is plotted for three values of the mobility, namely 25 (bottom curve), 250 (middle curve) and 675 cm²/Vs. In the figure, the plotted field value is the magnitude of Ey normalized to its maximum value at the input of the phase modulator (i.e., at x=−0.1 μm).

Experimental Example—High-Speed ENZ Amplitude Modulation

Silicon rib waveguides 400 nm and 800 nm in width were defined on an SOI wafer by electron beam lithography. Vertical grating couplers for use in testing were also defined by electron beam lithography. The structures were etched approximately 190 nm into the 290-nm device layer of the wafer.

Contact lithography was used to define the remaining elements of the device, including:
  the doped silicon region (implanted with boron, $3 \times 10^{15}$ cm$^{-2}$ at 10 keV),
  AlSi ohmic contacts alloyed to the doped silicon,
  the gate dielectric (5-nm HfO$_2$ deposited by atomic layer deposition),
  a 10-nm transparent conductive oxide layer of In$_2$O$_3$ formed by RF sputter-deposition, and
  the metal gate contact (200-nm gold).

A probe pad was placed directly on the SOI buried oxide to reduce leakage and capacitance.

The gate dielectric was deposited at 250° C. A post-deposition anneal for ten minutes at 600° C. yielded a uniform gate dielectric with a breakdown field of about 6 MV/cm.

The active modulation region was 4 μm long.

Figure 19:
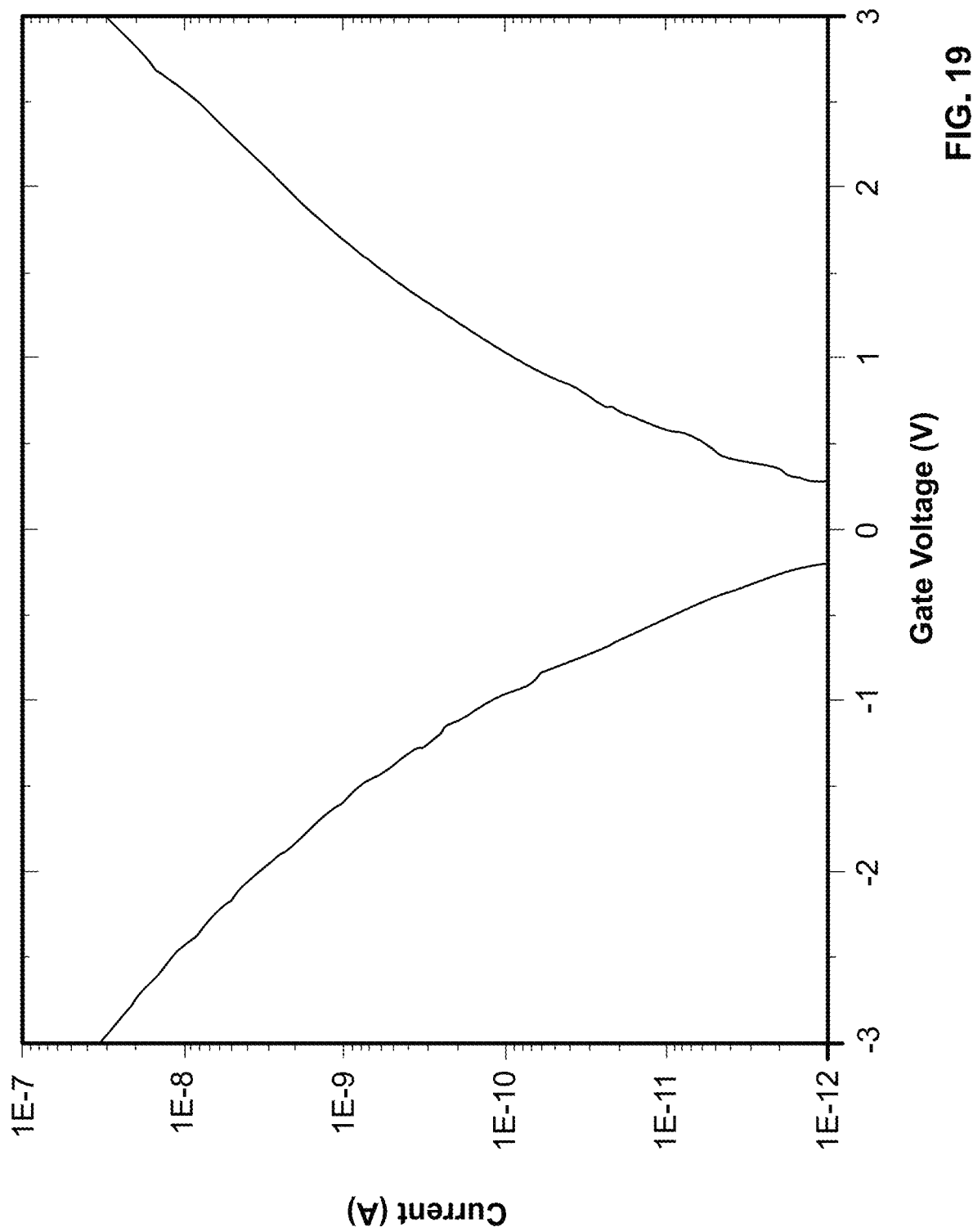
FIG. 19 is a graph of the measured leakage current across the gate dielectric of an example plasmonic electroabsorption amplitude modulator as a function of gate voltage.

FIG. 19 is a graph of leakage current across the HfO$_2$ gate dielectric as a function of gate voltage.

We performed optical testing of the device with CW laser light coupled through the grating couplers into the silicon waveguides. We measured the DC optical performance at wavelengths from 1530 nm to 1590 nm by electrically biasing the device and observing the transmitted output.

Figure 20:
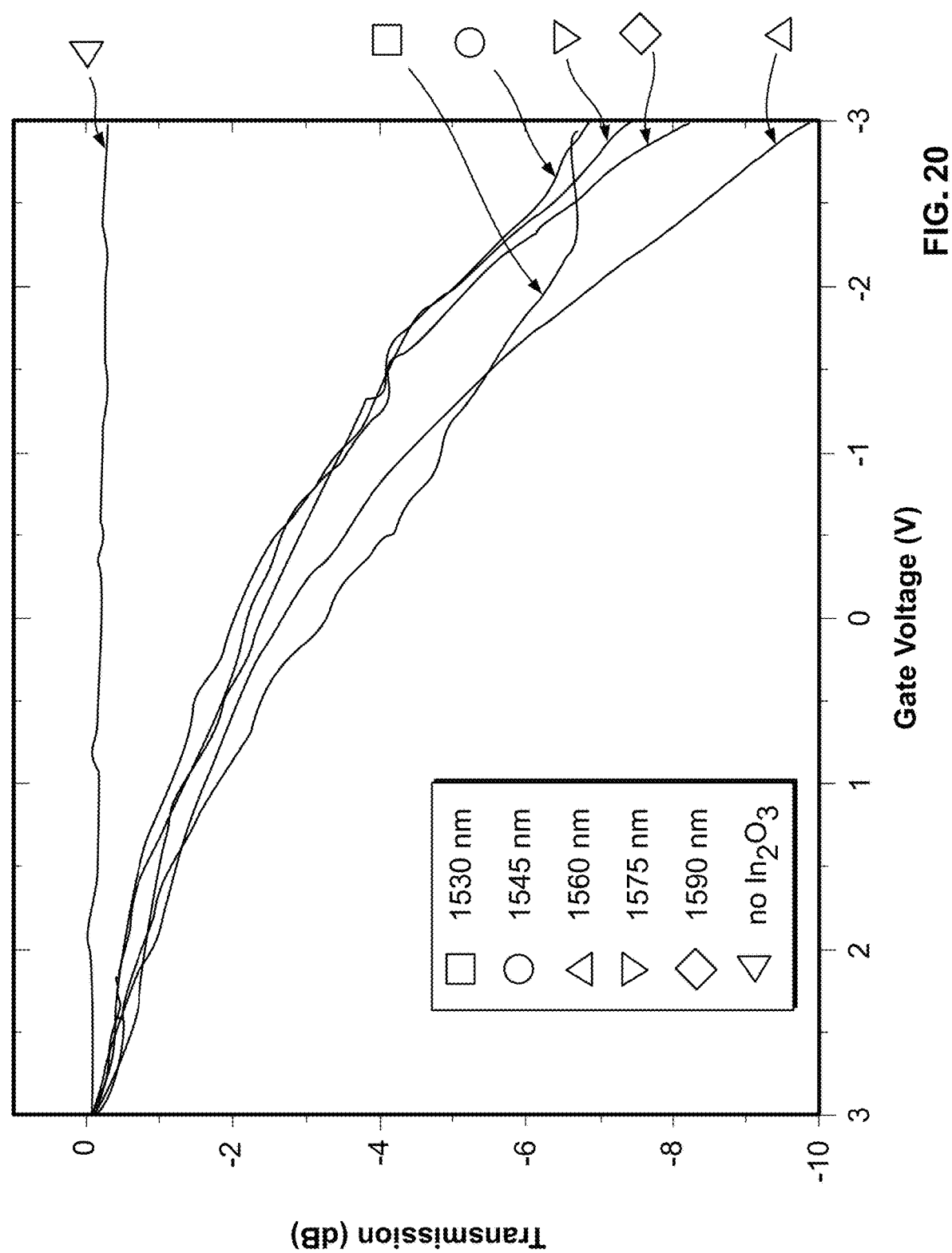
FIG. 20 is a graph of the measured DC optical transmission of the example modulator of FIG. 19 as a function of bias voltage.

FIG. 20 shows the DC optical transmission of the modulator as a function of bias voltage, normalized to the +3V level to exclude the wavelength dependence of the grating coupler. Also shown as the uppermost, horizontal curve is the response of a 16-μm-long control device that lacks the TCO layer. The wavelengths at which the transmission was measured, from uppermost to lowermost curve (as ordered at zero gate voltage and excluding the control curve) were: 1590 nm, 1575 nm, 1560 nm, and 1530 nm. A further curve, for 1545 nm, is obscured at zero gate voltage but is visible on the right-hand end of the graph, especially for gate voltages of −2.5V to −3V.

The control curve illustrates that the In$_2$O$_3$ layer accounts for essentially all the voltage dependence of the transmission.

The 4-μm modulator achieved greater than 6 dB of extinction over the tested voltage range. We measured an excess loss of about 10 dB.

We tested the performance of the device for high-speed digital modulation by applying RF drive signals and observing the optical output. An example drive signal was a long $2^{31}-1$ pseudo-random bit sequence (PRBS) pattern at a bitrate of 2.5 Gb/s. The drive signal had no DC offset bias, and it had a magnitude of 2 $V_{pp}$ at the modulator. (I.e., 1 $V_{pp}$ from the 50Ω pattern generator into the modulator capacitance.) The receiver was a commercial avalanche photodiode with a specified bandwidth of 1 GHz.

Figure 21:
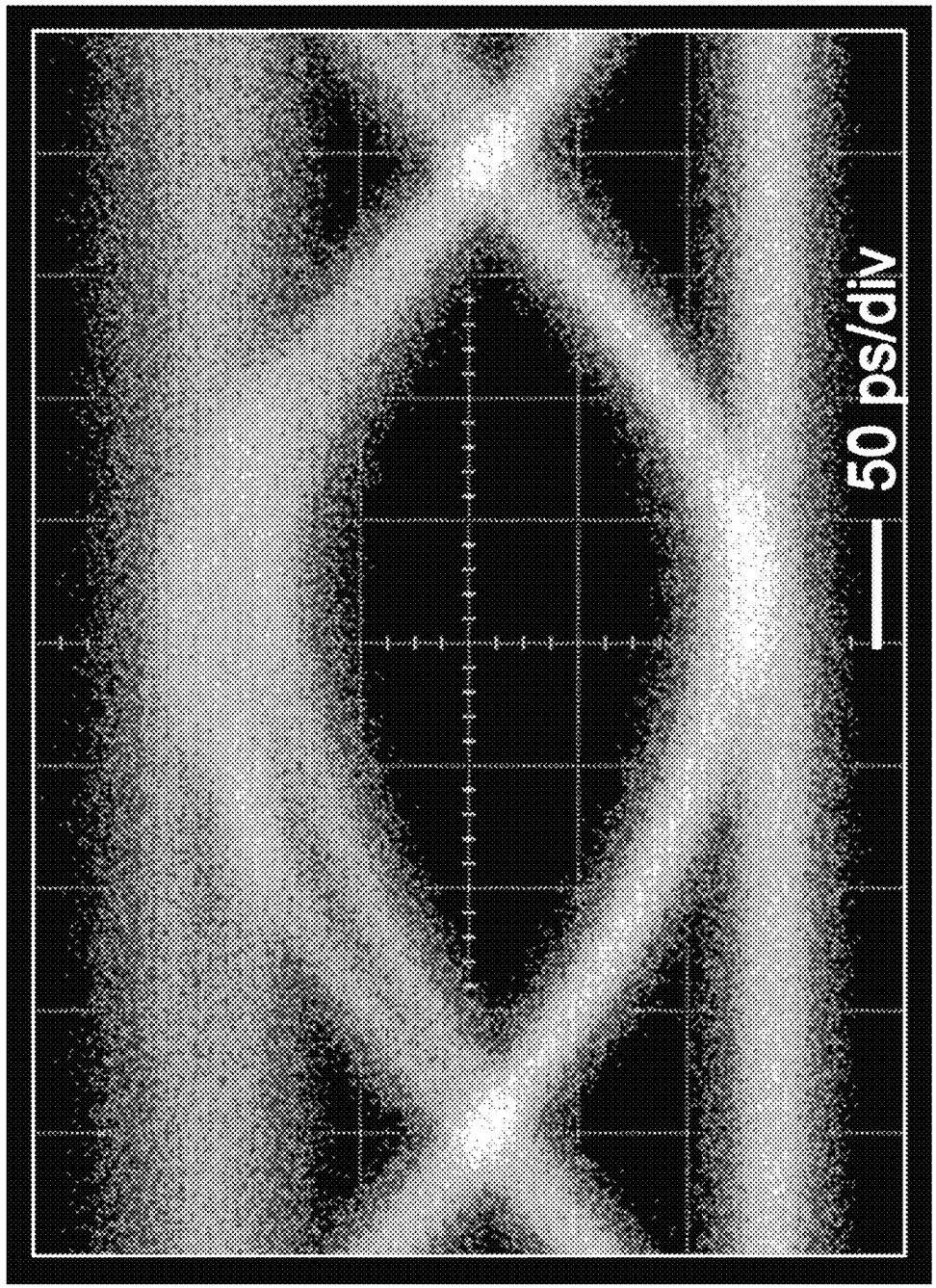
FIG. 21 is an eye diagram obtained from the output of the modulator of FIGS. 19 and 20 when the modulator was driven by an example drive signal.

FIG. 21 is an eye diagram obtained from the modulator output when the modulator was driven by the example drive signal described above. It is evident from the open eye that the example modulator can transmit data at a bitrate of 2.5 Gb/s at the drive voltage used in testing.

Further information about the example modulator may be obtained from Keeler 2017, which was cited above.

Further information may also be obtained from Michael G. Wood et al., "Gigahertz speed operation of epsilon-near-zero silicon photonic modulators," *Optica* 5, 233-236 (2018), the entirety of which is hereby incorporated herein by reference.

We claim:

1. A method of optical phase modulation, comprising:
  injecting an optical carrier wave having a carrier wavelength into a silicon optical waveguide having a non-resonant modulator section in which the optical waveguide is optically coupled to a layer of transparent conductive material having an epsilon-near-zero (ENZ) wavelength, wherein the transparent conductive material layer constitutes a portion of a capacitive structure that includes a gate dielectric layer; and
  while the optical carrier wave is propagating in the optical waveguide, applying a time-varying bias voltage across the gate dielectric layer, wherein the applied bias voltage is effective to decrease the ENZ wavelength and thereby shift the ENZ wavelength toward the carrier wavelength,
  wherein the time-varying bias voltage is varied in response to a modulation signal, and wherein the applying of the time-varying bias voltage impresses a phase modulation pattern on the carrier wave such that the modulated carrier wave constitutes a phase-modulated optical signal;
  and wherein the optical carrier wave is attenuated within the modulator section of the silicon optical waveguide by no more than 10 dB per 90° of phase change.

2. The method of claim 1, wherein the time-varying bias voltage is applied between an electrical contact to the transparent conductive material layer and an electrical contact to the gate dielectric layer.

3. The method of claim 1, wherein the transparent conductive material layer is constituted, at least in part, by cadmium oxide.

4. The method of claim 1, wherein the optical carrier wave has a vacuum wavelength in the range 750 nm to 3 μm.

5. The method of claim 1, wherein the modulation signal has a digital modulation rate of at least 1 Gbit per second.

6. The method of claim 1, wherein the applying of the time-varying bias voltage impresses a phase modulation pattern on the carrier wave with a phase modulation depth of at least 90°.

7. The method of claim 1, wherein the applying of the time-varying bias voltage impresses a phase modulation pattern on the carrier wave with a phase modulation depth of at least 90°, and wherein at least 90° of phase change of the carrier wave is produced within a propagation distance of 10 μm or less in the modulator section of the optical waveguide.

8. The method of claim 1, wherein the applying of the time-varying bias voltage impresses a phase modulation pattern on the carrier wave with a phase modulation depth of at least 90°, and wherein the optical carrier wave is attenuated within the modulator section of the optical waveguide by no more than 10 dB per 90° of phase change.

9. The method of claim 1, wherein the applying of the time-varying bias voltage impresses a phase modulation pattern on the carrier wave with a phase modulation depth of at least 90°, wherein: at least 90° of phase change of the carrier wave is produced within a propagation distance of 10 µm or less in the modulator section of the optical waveguide, and the optical carrier wave is attenuated within the modulator section of the optical waveguide by no more than 10 dB per 90° of phase change.

10. The method of claim 1, wherein the impressing of a phase modulation pattern on the carrier wave is performed with a phase modulation depth, per logarithmic unit of optical loss, per unit length, of at least 0.3/dB-µm.

\* \* \* \* \*